United States Patent [19]

Price et al.

[11] 3,940,694

[45] Feb. 24, 1976

[54] APPARATUS AND METHOD FOR REDUCING MULTIPLICATIVE GAIN VARIATION DISTORTIONS IN DATA RECORDING AND TRANSMISSION CHANNELS

[75] Inventors: Robert Price, Lexington; John W. Craig, Sudbury, both of Mass.

[73] Assignee: Sperry Rand Corporation, New York, N.Y.

[22] Filed: June 26, 1974

[21] Appl. No.: 483,340

Related U.S. Application Data

[63] Continuation of Ser. No. 193,898, Oct. 29, 1971.

[52] U.S. Cl. .............................................. 325/42
[51] Int. Cl.² ........................ H04B 1/00; H04B 1/10
[58] Field of Search ........ 325/33 R, 41, 42, 52, 62, 325/65; 333/14; 340/174.1 B, 174.1 G, 347; 178/68; 179/15.55, 15 AV; 328/145

[56] References Cited
UNITED STATES PATENTS

| | | | |
|---|---|---|---|
| 3,244,808 | 4/1966 | Roberts | 325/42 |
| 3,377,586 | 4/1968 | Kaneko | 179/15 AV |
| 3,388,330 | 6/1968 | Kretzmer | 178/68 |
| 3,492,578 | 7/1970 | Gerrish | 325/38 A |
| 3,496,468 | 2/1970 | Kaneko | 325/42 |
| 3,535,550 | 10/1970 | Kang | 333/14 |
| 3,548,323 | 12/1970 | Gordon | 325/46 |
| 3,601,702 | 8/1971 | Lender | 178/68 |
| 3,708,752 | 1/1973 | Fein | 333/14 X |
| 3,761,610 | 9/1973 | Krallinger et al. | 178/68 X |

*Primary Examiner*—Albert J. Mayer
*Assistant Examiner*—Robert Hearn
*Attorney, Agent, or Firm*—Howard P. Terry; Albert B. Cooper

[57] ABSTRACT

Data channel gain-variation distortions are reduced by the following combination of operations. Successively occurring data items are cumulatively added in modulo fashion thereby providing a sequence of partial sums. An exponentiating circuit is introduced to provide an exponential function of the partial sums. The exponentiated partial sums are then recorded or transmitted on a data channel wherein the signals are distorted by relatively slow gain variations thereof. The received distorted signals are applied to a logarithmic circuit wherein the multiplicative gain variation distortions are converted to additive distortions. The logarithmically converted signals are applied to a subtractor that sequentially provides the differences in modulo fashion between successively occurring signals from the logarithmic circuit thereby yielding the data items with the distortions substantially reduced.

37 Claims, 14 Drawing Figures

APPARATUS AND METHOD FOR REDUCING MULTIPLICATIVE GAIN VARIATION DISTORTIONS IN DATA RECORDING AND TRANSMISSION CHANNELS

This is a continuation of application Ser. No. 193,898, filed Oct. 29, 1971.

BACKGROUND OF THE INVENTION

1. Field of the Invention

The invention pertains to multiplicatively distorting data recording or transmission channels and has particular utility in high density digital recording systems.

2. Description of the Prior Art

It has been continuously desirable in digital mass data recording systems such as discs, drums and the like, utilizing magnetic recording media, to increase the density of the data recorded on the media. In this manner, the quantity of data stored in such systems may be increased. Conventionally, such systems utilize reading and writing heads that are aerodynamically supported a minute distance above the continuously rotating magnetic media. Prior art systems have to some extent been successful in increasing the data packing density by decreasing the head gap width, decreasing the head-to-media spacing, and decreasing the thickness of the magnetic recording media.

Additionally, present day systems utilize equalization circuits for decreasing inter-symbol interference and effectively increasing the recording frequency bandwidth thereby achieving higher data packing density. Although the prior art systems have been moderately successful in increasing the data storage density by the foregoing techniques, the maximum density heretofore achievable is significantly less than that predicted from theoretical considerations.

Typically, present day digital magnetic recording systems utilize the saturated flux recording technique wherein the flux in each data cell of the medium either remains saturated in the same direction as in the preceding cell or is switched to saturation in the opposite direction, to represent storage of a binary ZERO or binary ONE, respectively. Hence, under this system only one binary digit may be recorded in each data cell, the data cells being packed as densely on the medium as the foregoing prior art techniques will permit.

The prior art has contemplated that if instead of recording only one of two levels, i.e., one binary digit in each data cell, a larger number of levels were made possible, more than one binary digit could be stored in each data cell. For example, if it were possible to record a selected one of 8 discrete amplitude levels in a data cell, that cell would then be capable of storing three binary digits rather than one. Thus in addition to utilizing the aforedescribed prior art techniques for densely packing the data cells on the medium, a multifold increase in recorded information density may be achieved through multilevel recording.

Although contemplated by the prior art, multilevel digital recording has heretofore not been achievable because of multiplicative type gain variation distortions of the recording channels. Such gain variations may, for example, result from non-uniformity in the thickness of the magnetic coating. Variations in the distance between the write or read heads and the magnetic medium, caused for example by surface dimensional variations, also may result in gain variations of the channel. Because of the high data rate utilized in such systems, these gain variations which occur on a fractional-second time scale occur slowly relative to the recorded information rate. In such systems, although an anomalous gain change will normally be small from one recorded data item to the next, the gain excursions may be large in total effect so that distinguishing between one recorded level and another on data playback is rendered impossible. For example, if an aerodynamically supported read head should momentarily fly up due to a surface imperfection in the drum or disc, a large and unknown gain change will be multiplicatively imparted to the several hundred data words that may be read out during the anomolous condition. Thus previously contemplated multilevel recording systems would be unreliable in that gain variations would cause large blocks of data to be read out that bear no perceivable relationship to the corresponding data originally recorded. For the foregoing reasons, prior art digital recording systems have largely been limited to two oppositely saturated flux recording levels which naturally are differentially distinguishable from one another irrespective of the gain variations of the system. Hence, these prior art recording systems have been limited as to the information packing density achievable.

SUMMARY OF THE INVENTION

The present invention overcomes the gain variation limitation of the prior art systems, thus rendering multilevel data recording practical. The data items to be recorded are preconditioned in accordance with a preconditioning function. The preconditioned data items are next applied to an exponentiating circuit that provides an exponential function thereof. This exponential function of the preconditioned data is then written or recorded on the medium by a writing circuit. The reading circuit of the system provides signals representative of the recorded signals, the playback signals being subject to the multiplicative gain variation distortions of the channel. These distorted signals are applied to a logarithmic converter that converts the multiplicative distortions to additive distortions. The logarithmically converted signals are then applied to a restoration circuit having a function inverse to that of the preconditioning circuit which provides signals representative of the original data with the now additive distortions substantially filtered therefrom.

An embodiment of the invention is also contemplated wherein the data items are first exponentiated and then preconditioned with a ratio taking circuit utilized for the data recovery and distortion filtering. The data recovery portion of either embodiment is fully operable in combination with the recording portion of the other embodiment.

Thus, the long sought desideratum of the mass data storage industry of recording more than one binary digit in each data cell is rendered achievable and practical by the concepts of the present invention. Therefore, heretofore unachievable data packing densities are readily realized by utilizing the present invention. Additionally, the concepts of the present invention have far reaching utility in a wide variety of applications where system gain variations have heretofore rendered the use of a significant number of information levels impractical, hence severly limiting the information recording or transmission densities in these prior art systems in a manner to be further explained hereinafter.

DESCRIPTION OF THE PREFERRED EMBODIMENTS

The principles of the present invention have widespread utility in a large variety of applications. The invention is directed toward any data recording or transmission channel wherein the reproduced or received signals are multiplicatively distorted by gain variations of the channel. The invention is applicable to systems wherein the data exists in discrete level, discrete time format. Examples of such systems are in digital mass data magnetic storage systems such as the discs, drums and tapes in widespread usage in the computer industry. The principles of the invention are also applicable to systems wherein the data exists in continuous level, discrete time format such as in sampled analog systems and in instrumentation recording. The invention is additionally applicable to systems wherein the data exists in discrete level, continuous time or in continuous level, continuous time format such as in sample and hold analog systems or in voice communication channels, respectively.

The invention is applicable to magnetic, magneto-optic or thermoplastic recording systems and the like, as well as to communication channels having fading characteristics such as short-wave radio communication channels via the ionosphere or underwater acoustic communication channels. The invention also has utility in optical systems such as those concerning photographic processes or holography. The concepts of the present invention are applicable to these and other uses in a manner to be further discussed hereinafter.

Figure 1:
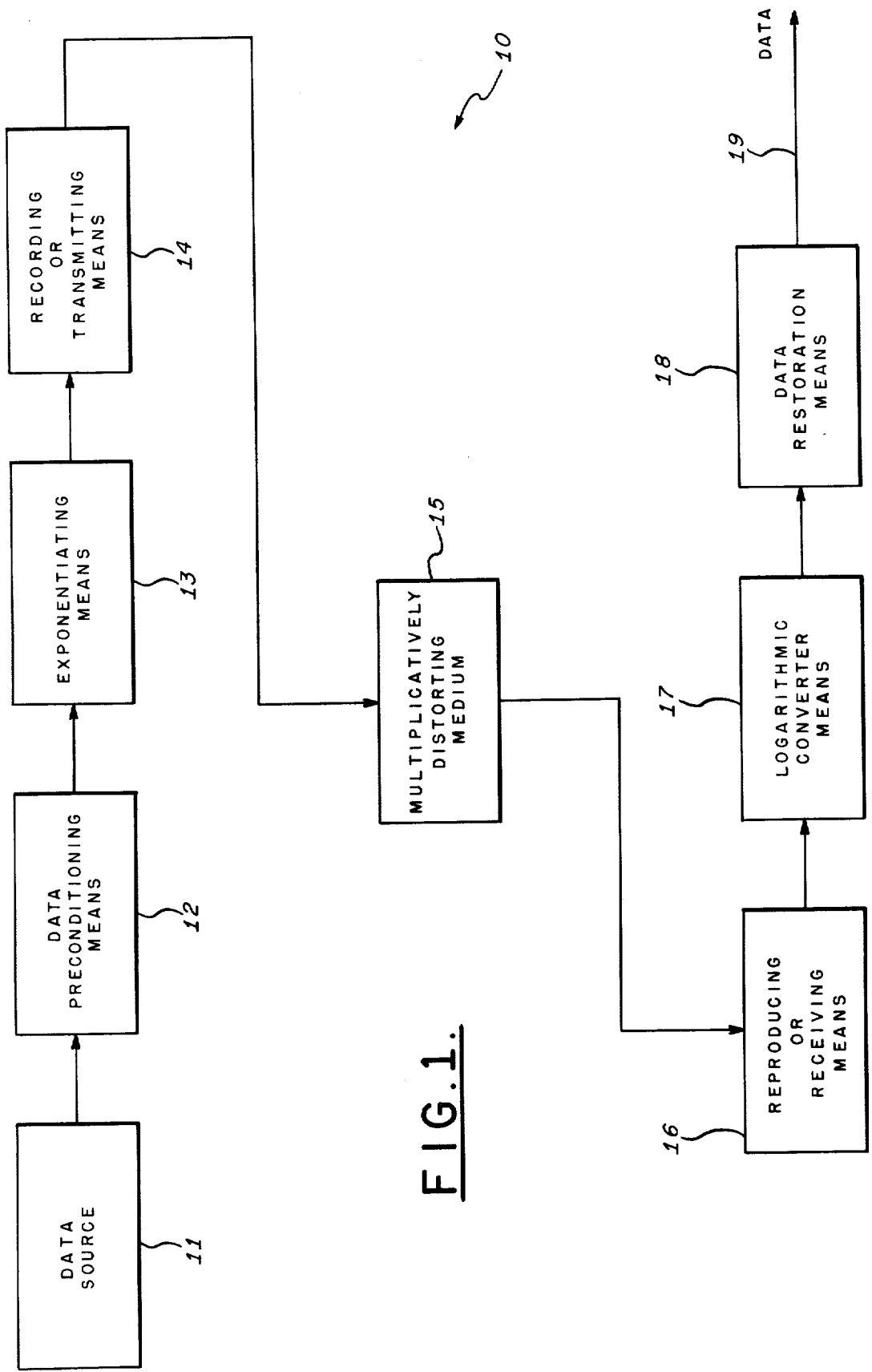
FIG. 1 is a block schematic diagram generally illustrating a data recording or transmission system embodying the concepts of the present invention.

Referring to FIG. 1, a data channel 10 is illustrated generally embodying the concept of the invention. It will be appreciated that the generalized system 10 is applicable to any of the data types described above as well as to recording and reproducing channels or transmitting and receiving channels. The data channel 10 includes a source of data 11 which provides to data preconditioning means 12 the data to be conveyed. The data preconditioning means 12 processes the data in accordance with a preconditioning function such that the data may ultimately be recovered without distortion in a manner to be later clarified. The preconditioned data from the data preconditioning means 12 is applied to an exponentiating circuit 13. The exponentiating circuit 13 provides an exponential function of the preconditioned data from the preconditioning means 12. The exponentiating circuit 13 operates in a manner to be explained later to provide a function proportional to a predetermined positive constant raised to a power equal to the preconditioned data. The exponential function from the exponentiating circuit 13 is applied to recording or transmitting means 14 which in turn records or transmits, via the multiplicatively distorting medium 15, a waveform whose level is proportional to the exponential function. For example, in a data recording channel the means 14 may include a magnetic write head and the medium 15 may be the magnetic surface of a disc, drum or tape recorder. In a data transmission channel the means 14 may be a radio transmitter and the medium 15, the path along which the radio waves travel. The preconditioned data whose exponential function has been recorded or transmitted on the medium 15 is reproduced or received by reproducing or receiving means 16. For example, in a recording channel the reproducing means 16 may include a magnetic read head and in a data transmission channel the receiving means may be a radio receiver.

It will now be appreciated that in sending the signals from the means 14 through the medium 15 to the means 16, multiplicative distortions may be imparted to the signals. For example, in a magnetic data recording and reproducing channel, multiplicative distrotions may be imparted to the signal recorded on the medium 15 by channel gain variations caused, typically, by variations in the flying height of the read head or write head and in the thickness of the magnetic recording medium. In a radio data communication channel, as another example, channel fading may impart multiplicative distortions to the transmitted data.

The distorted reproduced or received signals provided by the reproducing or receiving means 16 are applied to logarithmic converter means 17, wherein the multiplicative distortions of the data are converted to additive distortions in a manner to be further described. Additionally, since the logarithmic function performed by the means 17 is the inverse of the function performed by the exponentiating means 13, the logarithmic converter 17 provides the preconditioned data with the now additive distortions combined therewith. The output of the logarithmic converter means 17 is applied to data restoration means 18 that restores the additively distorted preconditioned data in accordance with a restoration function. The restoration function is chosen in a manner to be described such that the additive distortions are substantially filtered from the preconditioned data. Furthermore, the preconditioning function provided by the means 12 is chosen to be the inverse of the restoration function provided by the means 18 such that not only are the additive distortions filtered from the signal provided by the logarithmic converter means 17 but the preconditioned data from the data preconditioning means 12 is restored to provide the original data on a lead 19.

Figure 2:
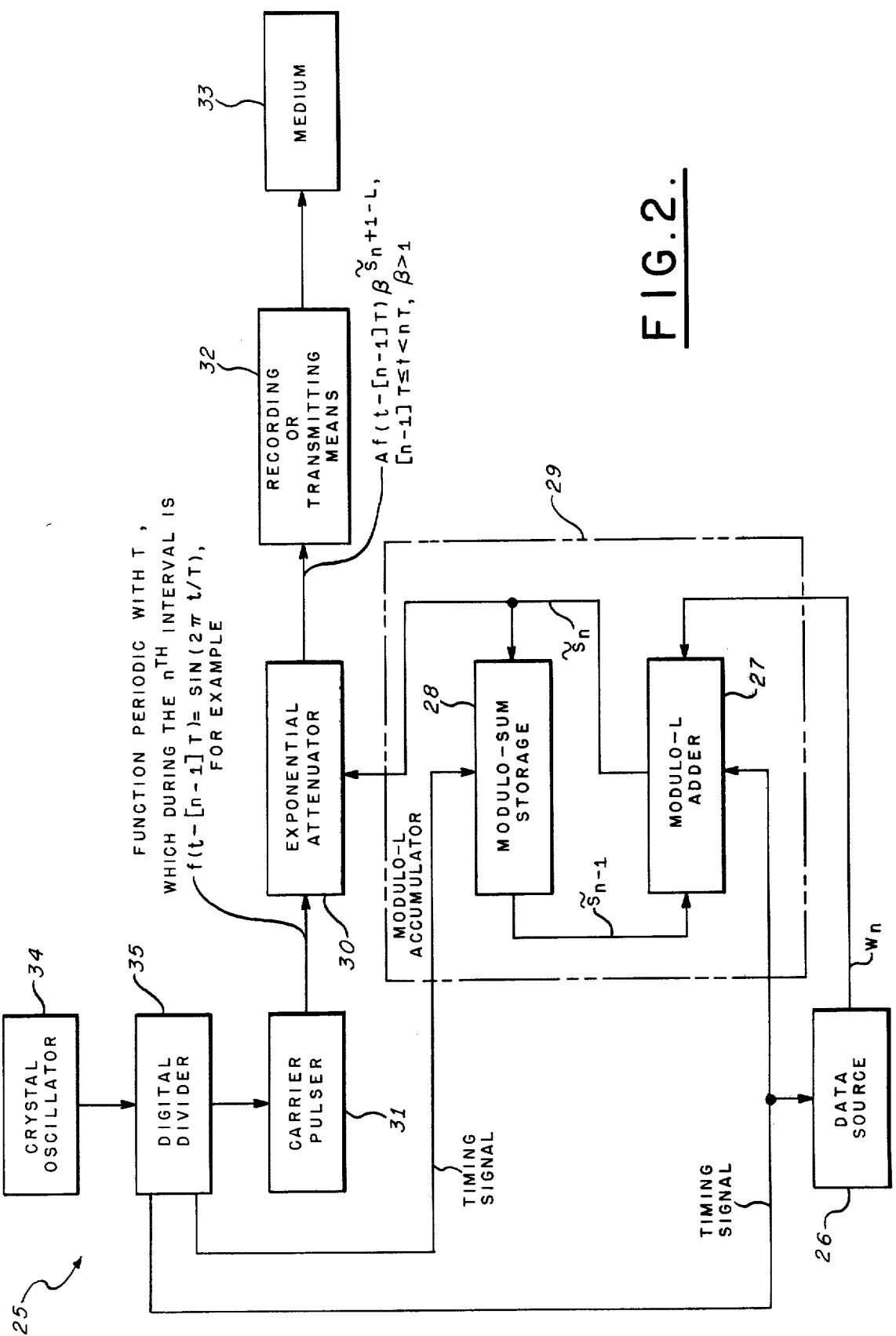
FIG. 2 is a block schematic diagram of the data recording or transmitting portion of a preferred embodiment of the invention.
Figure 3:
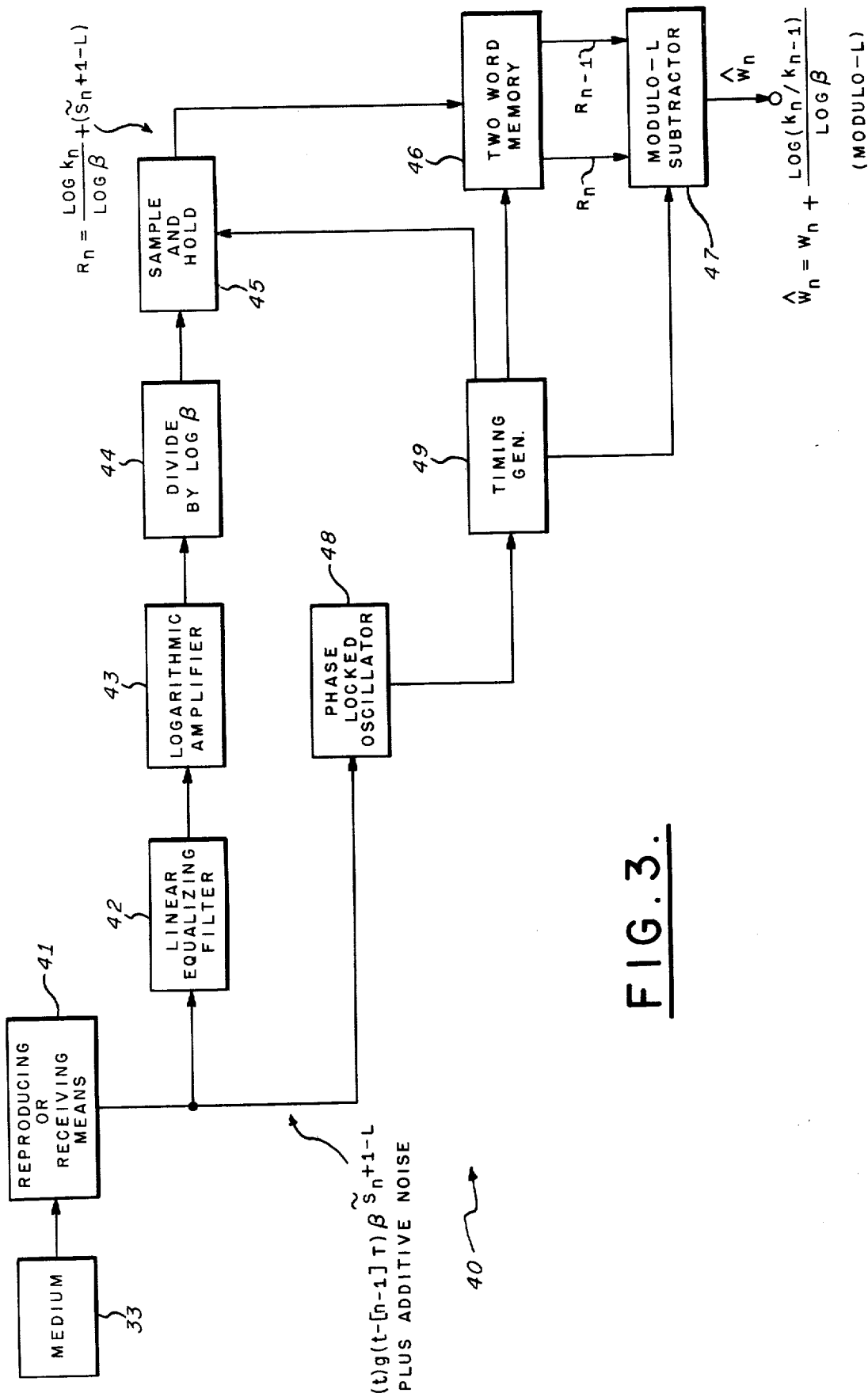
FIG. 3 is a block schematic diagram of the reproducing or receiving portion of the preferred embodiment whose recording or transmitting portion is depicted in FIG. 2.

FIGS. 2 and 3 illustrate a data channel instrumented in accordance with a preferred embodiment of the present invention. FIG. 2 depicts the data recording or transmitting portion of the channel and FIG. 3 depicts the data reproducing or receiving portion thereof. It will be appreciated that the data channel illustrated in FIGS. 2 and 3 is adapted to process discrete time data that may exist as discrete digital levels or as continuous level analog signals. Furthermore, the data channel illustrated in FIGS. 2 and 3 may be utilized for either data recording and reproducing or data transmitting and receiving. It will be appreciated from the descriptions to follow that the embodiment illustrated in FIGS. 2 and 3 is particularly adapted to substantially prevent multiplicative distortions in a data channel from affecting a sequence of input data items, where the multiplicative distortions vary slowly relative to the rate of the input data. The embodiment of the invention illustrated in FIGS. 2 and 3 will primarily be described in terms of digital discrete level data and also in terms of continuous level analog signals. For purposes of explanation, the invention will be described in terms of a digital magnetic recording system of the type utilizing drums, discs or tapes wherein a plurality of discrete amplitude levels are recorded into each data cell thereby increasing the binary data packing density.

Generally, a binary word comprising B data bits is to be recorded into each data cell of the medium. The data words can assume a discrete set of values over the integers zero to $(L-1)$, inclusive, e.g., $L=2^B$, to record the B bits of information into each cell. Each B-bit word is added, modulo $2^B$, to the sum of all the preceding words by means of an accumulator that is adapted to modulo overflow in accordance with the base L. The accumulator output is digital-to-analog converted on an exponential scale by means of an exponentially attenuating network whose output linearly amplitude modulates a suitable carrier signal. The amplitude modulated carrier signal during a data interval is linearly recorded in a data cell of the magnetic medium by linearizing the medium over the range of input signal levels by using, for example, the conventional high frequency bias field technique of the analog recording technology. Alternatively, the medium non-linearity might be corrected by other means such as the use of a compensatory non-linear input-output characteristic. The signal recovered from the medium upon playback by demodulating the recorded amplitude modulated carrier is often multiplicatively distorted by the fluctuating gain of the magnetic storage channel, which varies rapidly on a fractional-second time scale yet slowly relative to the recorded information rate. This gain variation may result from the non-uniform thickness of the magnetic coating and the variation in distance between the write or read head and the magnetic material. The data is recovered by taking the logarithm of the signal amplitude reproduced from each cell thus converting the multiplicative gain variations to additive distortions. Successive differences of the logarithmic signals are then taken modulo $2^B$, leaving an additive error which is equal to the logarithm of the ratio between the gain values during two successive data time intervals and which usually will be of small magnitude since the gain variations from word to word are small. Thus, the slowly varying gain fluctuations are substantially cancelled between adjacent data intervals even though the cumulative change in gain over many words is significantly larger than the minimum change that may cause an error between successive words in a multilevel recording system absent the present invention.

Referring now to FIG. 2, the data recording portion 25 of the data channel is illustrated. A data source 26 provides a sequence of data words $\{W_n\}$. At the beginning or just prior to each data word interval of duration T seconds, a new data word $W_n$ is provided by the source 26 for recording or transmission during the $n^{th}$ data interval. When the data is in digital form, the $n^{th}$ data word $W_n$ can be selected from a uniformly spaced set of L discrete values: $0, 1, 2 \ldots L-1$, where L is an appropriate base selected in a manner to be described. If, however, the data is in analog form, $W_n$ can have a continuum of values in the range $0 \leq W_n < L$, where L need not be an integer, which analog embodiment will be later described. The data source 26 may, for example, provide three-bit binary words corresponding to integer values from 0 to 7, where the base L equals 8.

The sequence of data words from the source 26 is applied as an input to a modulo-L adder 27. The adder 27 in turn provides its output to a modulo-sum storage 28 whose output is fed back with a delay of one word interval and applied as an input to the modulo-L adder 27. The adder 27 and the storage 28 are connected to form a conventional accumulator 29 for accumulating the sequence of data words from the source 26 in modulo-L fashion, thus providing a sequence of partial sums. As is known, modulo-L accumulation is achieved by incrementally adding the sequence of numbers from the data source 26 to the number stored in the accumulator 29, thereby increasing it until the value L would just be reached, except that instead of permitting this to happen the accumulator 29 is at that point reset back to zero and the remainder of the addition continues therefrom. Thereafter, the accumulator 29 continues to overflow at each approach to the value L, and its output thus never reaches or exceeds this value.

Modulo-L accumulation may, for example, be conveniently achieved by utilizing an adder 27 with B binary stages, where $2^B=L$, and discarding the overflow signals from the most significant stage thereof. For instance, in a system where it is desirable to store a selected one of eight discrete levels in each data cell, each word from the data source 26 would comprise three bits. Thus, each word from the data source could have an integer value from 0 to 7. In this example, the modulo-L adder 27 as well as the modulo-sum storage 28 would each comprise three binary stages, thus limiting the number stored in the accumulator not to exceed the value 7. For example, if the accumulator 29 is storing the number 3 and the data source 26 provides a number 2 to be added thereto, the accumulator 29 performs the modulo-L addition resulting in the value 5 now being stored therein. When, however, the accumulator 29 is storing the value 5 and the data source 26 provides the number 4 to be added thereto, the modulo-L addition is performed with the resultant modulo-L sum of 1 now being stored in the accumulator 29. It will be appreciated that with such a system, three bits may be stored unambiguously in each data cell on the medium thus achieving a three-fold improvement in information packing density compared to the conventional saturated flux storage technique.

The output of the accumulator 29 is applied as an input to an exponential attenuator 30, which also receives a carrier signal from a carrier pulser 31. For reasons to be explained, the carrier signal provided by the carrier pulser 31 may be a sine wave of period T seconds, or may assume other forms in a manner to be discussed. The exponential attenuator 30 is effective in amplitude modulating the carrier signal from the carrier pulser 31 in accordance with an exponential function of the signal from the accumulator 29. The amplitude of the signal from the exponential attenuator 30 is proportional to a predetermined constant $\beta$ raised to a power equal to the accumulated data from the accumulator 29 where, in the present instance, $\beta$ exceeds unity.

The output of the exponential attenuator 30 is applied to recording or transmitting means 32 which, in the digital magnetic recording system described, comprises the write head and the corresponding circuitry, possibly including waveform-shaping or spectrum-shaping filters, for recording the output of the exponential attenuator 30 on a magnetic medium 33. The recording means 32 and the medium 33 may comprise part of a conventional linearized magnetic recording system of a type well known in the art and readily commercially procurable.

The timing for the data recording portion 25 of the data channel is provided by a stable crystal oscillator 34 that provides timing signals to the data source 26, the accumulator 29 and the carrier pulser 31 via a digital divider 35 in a conventional manner.

In the operation of the data recording portion 25 of the data channel of FIGS. 2 and 3, prior to the data source 26 providing a set or block of data words $W_1$ through $W_N$, the storage register 28 is set equal to zero. At the beginning of each data interval or just prior thereto, a new data word is provided by the source 26. During the $n^{th}$ data interval, the data word $W_n$ is provided thereby. During the $n^{th}$ data interval, the modulo-L adder 27 adds, with the possible discarding of an overflow, the latest data word $W_n$ provided by the data source 26 to the previously modulo-L accumulated partial sum $\tilde{S}_{n-1}$, and the result $\tilde{S}_n$ is transferred to the storage register 28 and controls the amplitude modulation of the carrier signal from the carrier pulser 31 through the exponential attenuator 30. Thus during the $n^{th}$ data interval, $(n-1) T \leq t < n T$, $$\tilde{S}_n = \sum_{j=1}^{n} W_j = W_n + \tilde{S}_{n-1}, \text{ modulo } L \quad (1)$$

Since just before the beginning of the transmission of the set of data words $W_1$ through $W_N$ from the data source 26, the storage register 28 is set equal to zero, i.e. $\tilde{S}_0 = 0$, the operation of the accumulator 29 is described by the righthand expression of Equation (1). After the block of data words $W_1$ through $W_N$ has been processed through the data recording portion 25 of the system, the storage 28 may be reset to zero in preparation for the next occurring block of data words.

The exponential attenuator 30 operates in discrete time intervals in a manner to be explained. Thus, during the $n^{th}$ data interval, $(n-1) T \leq t < n T$, the gain through the attenuator 30 is proportional to $\beta^{\tilde{S}_n}$ for reasons to be discussed. The output of the exponential attenuator, whose levels may now be seen to form what is mathematically termed a geometric series, therefore may be expressed as:

$$Af(t - [n-1]T)\beta^{\tilde{S}_n + 1 - L} \quad (2)$$

for the $n^{th}$ interval as indicated by the legend. With the predetermined constant $\beta > 1$ and with $|f_{max}|$, the maximum absolute value of $f(t)$, equal to unity, the positive factor A is indicative of the maximum amplitude of the signal from the exponential attenuator 30 and is dependent upon the parameters of the specific circuit instrumentation of the embodiment of the invention. It is appreciated that the function $f(t)$ is interpreted as having zero amplitude outside of the interval between zero and T. The signal at the output of the exponential attenuator 30 provides the waveform which is recorded as magnetic flux on the medium 33 via the recording means 32 in a rotating-medium mass data storage system or provides the waveform transmitted over the channel medium 33 via the transmitting means 32 in a data transmission system. The recording or transmitting means 32 may include waveform-shaping or spectrum-shaping filters for improving the performance of the system in combination with equalization performed in the reproducing or receiving portion of the data channel depicted in FIG. 3, as later described. The means 32 may also include switching to disconnect its input from the output of the exponential attenuator 30 at times outside an interval containing the first through $n^{th}$ data intervals, thereby conserving power during those non-data-conveying times.

The relationship between the predetermined constant $\beta > 1$ associated with the exponential attenuator 30 and the base L associated with the modulo-L accumulator 29 will now be discussed using a somewhat simplified analysis. In a discrete digital data recording system, L is equal to the number of levels into which the data cell flux is quantized in geometric-series progression, so that for greatest data density L should be as large as is consistent with reliable performance. Referring to the legend in FIG. 2, it is seen that when the partial sum $\tilde{S}_n$ from the accumulator 29 achieves its maximum value of $L-1$, $\beta^{\tilde{S}_n + 1 - L}$ assumes the maximum value of unity provided that $\beta > 1$. The exponential attenuator 30 is then appropriately at its minimum attenuation and hence its output is at its highest level, of which level the factor A is indicative as explained in connection with Equation (2). On the other hand, the two lowest levels, of which $A\beta^{2-L}$ and $A\beta^{1-L}$ are similarly indicative, are the levels closest together and hence most likely to be confused with each other in the presence of additive system noise, thus affecting system reliability. For best utilization of the system dynamic range and for greatest reliability, A should be set at or near the upper limit of the range, whereupon in a simplified design $\beta$ may be chosen to maximize the difference $(A \beta^{2-L} - A \beta^{1-L})$. It is readily found that the maximizing value of $\beta$ is given by $\beta = (L-1)/(L-2)$, when $L > 2$, irrespective of the value of A or the intensity of the additive noise. It is then determined that if the minimum tolerable level spacing is denoted by D, which depends on the rms value of the additive noise in the system and on the required data reliability, then the maximum number of levels L which can be reliably accommodated per data cell is given by the largest integer for which $(L-1)^{L-1}/(L-2)^{L-2}$ does not exceed A/D. A more exact design would treat the effects of additive noise on the logarithmic converter means 17 and data restoration means 18 of FIG. 1 rather than considering the difference $(A\ \beta^{2-L} - A\ \beta^{1-L})$ between the two lowest levels. It is appreciated that linear magnetic recording systems of the type contemplated by the present invention usually have high maximum playback signal to noise ratios corresponding to high values of A/D, and hence are eminently suited to incorporate advantageously the principles of the present invention for achieving a large number of possible levels per data cell and thereby gaining significantly improved digital recording density.

Referring now to FIG. 3, the data reproducing or receiving portion 40 of the data channel is illustrated. The signal recorded on or transmitted by the medium 33 of FIG. 2 (the medium 33 also being illustrated in FIG. 3 for clarity) is reproduced or received by reproducing or receiving means 41. In the digital magnetic recording system in which the present invention may be utilized, the reproducing means 41 would comprise the read head and the associated electronic circuitry. The level of the reproduced signal from the means 41 is identical to that of the recorded signal as indicated by the legend, except for the channel gain variation which is denoted by the factor $k_n(t)$ and in which the factor A of the legend of FIG. 2 has been included.

Generally, however, in addition to the multiplicative distortion $k_n(t)$, the reproduced signal will also be distorted both by unavoidable additive noise interference and by substantially time invariant linear filtering, the latter being inherent to playback through the inductive magnetic-to-electrical reading mechanism and to the associated electronic circuitry of the reproducing means 41. The filtering distortions, which are expressible in terms of frequency dependent deviations of the playback phase and amplitude characteristics from ideal, cause the known phenomenon of inter-symbol interference. The legend of FIG. 3 indicates this playback filtering distortion through the substitution of the time function $g(t)$ for $f(t)$, where $g(t)$ is the playback response to the magnetic flux pattern generated in the recording medium 33 by the T-limited recording carrier $f(t)$ after its passage through the recording means 32 of FIG. 2. In general, the response $g(t)$ extends outside the data interval to produce inter-symbol interference. In conventional magnetic recording systems employing inductive playback, this inter-symbol interference distortion may be severe since the electrical voltage from the read head is proportional to the time derivative of the recorded flux which is responsive of the data modulated signal, rather than of the recorded flux itself.

The output of the reproducing or receiving means 41 is applied to a linear equalizing filter 42 to correct the playback inter-symbol interference distortion. The equalizing filter 42 is designed so that at the end of each data interval, or possibly at a later time by a fixed delay, the output therefrom is proportional to the modulation level during that interval and is minimally affected by the modulations of all other data intervals. The equalization in effect provides an increase in the bandwidth of the system thereby achieving a further improvement in recording density through closer packing of the data cells in addition to the significant improvement effected by the invention by permitting the number of data cell levels to be increased above two. Additionally, the linear equalizing filter 42 is designed to pass a minimum of noise while performing the equalization. A linear equalizing filter of the type suitable for use in the present invention, and which also possesses the ability to automatically adjust its parameters to existing playback signal and noise conditions, is described in British Pat. No. 1,178,769, "Improvements in or Relating to the Transmission of Data" published Jan. 21, 1970.

The formulas for the equalizer design are well known, and depend on the shapes of the playback response $g(t)$ and the additive noise power spectrum. Further, the shape of the function $g(t)$ may be designed, subject to a limitation on the power of the recording current in the write head, so that the performance of the equalized data system is as reliable as possible. The shape of $g(t)$, or equivalently of its spectrum, may be controlled to an adequate extent by introducing a shaping filter into the recording means 32 of FIG. 2.

It will be appreciated that the parameters L and $\beta$ of the data recording portion 25, illustrated in FIG. 2, of the data channel should be propitiously chosen in accordance with the maximum signal to noise ratio at the output of the linear equalizing filter 42 so as to optimize system performance as discussed above. Alternatively, L and $\beta$ may be chosen according to the maximum ratio of signal to combined noise and inter-symbol interference should a significant amount of the latter remain at the equalizer output.

In accordance with conventional equalizer concepts, the linear equalizing filter 42 provides optimum sampling instants with respect to the data intervals when the inter-symbol interference is minimized while under this constraint the maximum attainable signal to noise ratio is achieved. Alternatively, the linear equalizer 42 could be designed so that at each data sampling instant the maximum ratio is attained between the signal power and a weighted sum of the inter-symbol interference and noise powers. Since in the present embodiment the channel gain $k_n(t)$ varies slowly relative to the modulation interval T, the output level from the linear equalizing filter 42 at the sampling instant associated with the $n^{th}$ data interval may be expressed as $k_n \beta^{s_n + 1-L}$, where $k_n$ is proportional to the average value of $k_n(t)$ over the $n^{th}$ data interval. The averaged gain $k_n$ also includes the effective gain of the sampled, fixed response of the linear equalizing filter 42 to the playback waveform $g(t)$.

The output of the linear equalizing filter 42 is applied to a logarithmic amplifier 43 that, at least at the optimum data sampling instants, provides over the required dynamic range an accurate, fixed logarithmic function of the absolute magnitude of the input to the means 43. The logarithmic amplifier 43, whose logarithmic base may be any convenient positive number, is effective to convert the averaged multiplicative distortions $k_n$ to additive distortions in a manner soon to be clarified. The logarithmic amplifier 43 is a conventional circuit readily procurable commercially from a wide variety of electronic circuit manufacturers. The output of the logarithmic amplifier 43 is applied through a $\log\beta$ divider 44 to a sample and hold circuit 45. The $\log\beta$ divider 44 normalizes the output of the logarithmic amplifier 43 by dividing it by the constant log$\beta$, where the logarithmic base is the same as that adopted for the logarithmic amplifier. The output of the log$\beta$ divider 44 is sampled by the sample and hold circuit 45 at the optimum sampling instants discussed above where the signal is strongest relative to the inter-symbol interference and the additive noise. Thus, neglecting the inter-symbol interference and noise, the sample taken at the optimum sampling instant associated with the $n^{th}$ data interval may be expressed as:

$$R_n = \frac{\log k_n}{\log \beta} + (\tilde{S}_n + 1 - L) \qquad (3)$$

It will thus be appreciated that the logarithmic amplifier 43 has converted the multiplicative distortion of the slowly varying channel gain to an additive disturbance represented by the term $\log k_n/\log\beta$.

The output of the sample and hold circuit 45 is applied to a two-word memory 46. The two-word memory 46 is a conventional device for simultaneously storing the two most recent samples provided by the sample and hold circuit 45 and also applying these two samples to a modulo-L subtracter 47. When the sample $R_n$ for the $n^{th}$ data interval is taken, the modulo-L subtracter 47 subtracts from it the previously obtained sample $R_{n-1}$ in modulo-L fashion. The modulo-L subtracter 47 is similar to the modulo-L adder 27 of FIG. 2 except that the underflows of the former are discarded to provide the modulo-L operation. Associated with the $n^{th}$ data interval, the modulo-L subtracter 47 provides a signal representative of the $n^{th}$ data word $W_n$ emanating from the data source 26 of FIG. 2. Accordingly, from Equations (1) and (3) the output of the modulo-L subtracter 47 may be expressed as:

$$\hat{W}_n = W_n + \frac{\log(k_n/k_{n-1})}{\log \beta}, \text{ modulo } L \qquad (4)$$

Thus it will be appreciated that the signal $W_n$ is comprised of the desired data word $W_n$ plus an error term proportional to $\log(k_n/k_{n-1})$. Since the channel gain varies slowly relative to the data rate, the term $k_n/k_{n-1}$ will be nearly unity and hence the term $\log(k_n/k_{n-1})$ will be substantially zero. Thus, by the sequence of operations described above, the slowly varying multiplicative distortions have been substantially reduced.

As described with respect to FIG. 2, the exponential information levels are amplitude modulated in unipolar fashion upon a periodic carrier signal. If, for example, the carrier is a sine wave of period T equal to the data interval as shown in FIG. 2, and if the recording means 32 acts as a linear time invariant filter as then would normally be the case, the signal recorded on the medium 33 and reproduced therefrom by the reproducing means 41 of FIG. 3 will contain a line in its spectrum at the data-interval frequency. Provided that this line is of reasonable strength, the output of the reproducing means 41 may be applied to a conventional phase locked oscillator 48. This oscillator 48 phase locks onto the spectral line, thereby effectively filtering it to provide timing signals to the sample and hold circuit 45, the twoword memory 36 and the modulo-L subtracter 47. These timing signals are generated from the phase locked oscillator 48 via a timing generator 49 in a conventional manner.

Equation (4) above indicates that the output $\hat{W}_n$ of the subtractor 47 is equal to the actual transmitted data word $W_n$ with a small residual error term added thereto. In the digital discrete level embodiment of the invention, a decision must be effected from $\hat{W}_n$ as to which of the L possible data levels was transmitted. This may conveniently be accomplished by selecting the level which is closest, modulo-L, to the signal $\hat{W}_n$. Generally a more effective, although complicated, procedure would be to establish L decision thresholds to yield minimum probability of decision error.

In will be appreciated that the means 41-49 of the data reproducing portion 40 may be analog in nature when the data processed by the system is of the discrete time continuous level type. When this is the situation, the signal $\hat{W}_n$ from the subtracter 47 may be utilized as the estimate of the transmitted data word $W_n$ or may be further filtered to improve the reception if the statistics of the analog information and the gain variations are known.

Equation (4) provides an indication of the effect of channel gain variations on the system error. The change in gain from word to word limits the accuracy with which the value of $W_n$ can be measured in the reproducing or receiving portion 40 of the data channel. When the data is of analog, continuous level nature, some error always occurs in the presence of gain fluctuations, but then an appropriate performance criterion is the root-mean-square difference between $W_n$ and $\hat{W}_n$, which is the rms value of $\log(k_n/k_{n-1})/\log\beta$. It will be appreciated that if the channel gain varies slowly or if $\beta$ is large, errors for this system will be substantially smaller than for prior art systems absent the present invention.

For discrete level modulation embodiments of the invention such as in digital magnetic recording systems, it is preferable to utilize a digital instrumentation for certain of the operations. The reproducing or receiving portion 40 of FIG. 3 may conveniently be configured to process digital data by inserting a conventional analog-to-digital converter between the sample and hold circuit 45 and the two-word memory 46. In this embodiment the memory 46 and the subtracter 47 may comprise conventional digital circuits. An alternative digital embodiment may be realized by connecting the output of the linear equalizing filter 42 directly to the input of the sample and hold circuit 45. The output of the sample and hold circuit 45 would be converted to digital format by means of an analog-to-digital converter. The output of the converter would then be applied to the memory via a conventional digital logarithmic converter followed by a conventional digital log$\beta$ divider. As a further alternative embodiment, the analog-to-digital converter and the logarithmic converter may be combined into a unitary circuit. It will additionally be appreciated that for the analog instrumentation the order may likewise be inverted between the sample and hold circuit 45, and the combination of the logarithmic amplifier 43 followed by the log$\beta$ attenuator 44.

In a manner similar to that described above, Equation (4) provides an indication of the effect of channel gain variation on the error of the discrete level modulation system. If the error term $\log(k_n/k_{n-1})/\log\beta$ is of magnitude less than one-half, then no error is committed if the output signal $\hat{W}_n$ of the reproducing or receiving portion 40 of the data channel is rounded to the nearest integer, yielding the output word designated as $W_n$. This condition with respect to the error term is readily achievable for each data word in a long sequence of words even though the cumulative change in gain over the time interval occupied by the sequence of words may be large enough to produce numerous errors in a prior art system absent the present invention.

Errors in the digital version of the invention can occur as follows: if during the $n^{th}$ data interval a gain change should occur such that $k_n/k_{n-1}$ is sufficiently different from unity to cause an error in $\underline{W}_n$, and if during the next data interval the gain returns to its previous value, i.e. $k_{n+1} = k_{n-1}$, an error occurs in $\underline{W}_{n+1}$ of opposite sign to the error that occurred in $\underline{W}_n$. If, however, during the next data interval the gain remains at its new value, i.e. $k_{n+1} = k_n$, then an error only occurs in $\underline{W}_n$ and not in $\underline{W}_{n+1}$. Thus, if the gain is the same before and after a single word which is subject to a large change in gain, such as for example might be caused by a "pin hole" flaw in the magnetic medium, or if an isolated noise transient should occur, both $\underline{W}_n$ and $\underline{W}_{n+1}$ but no other word will be in error. If, however, there is a large step change in gain at a time t for which $(n-1)T < t < nT$ and no other change in gain occurs, only $\underline{W}_n$ will be in error. Thus, it is appreciated that should a substantial short-duration anomaly occur during playback it at least will not cause error propagation in the recovered data. Such a failure produces errors only in the information word of the corresponding interval and at worst in the following word. If required by system performance, these potential double adjacent errors may be obviated by conventional error detection and correction coding of the data, which additionally provides improvements in system performance well appreciated in the art.

It is appreciated from the foregoing that the reproducing or receiving portion 40 of FIG. 3 substantially cancels slowly varying gains fluctuations between adjacent signalling intervals. It is further appreciated, however, that the first transmitted word $W_1$ of a block of data words cannot generally be recovered because the subtraction operation of the subtracter 47 necessarily lacks the value $R_o$ for the interval preceding the first data interval, unless an allowed level is in fact transmitted before data commences. Accordingly, the first word $W_1$ may arbitrarily be set to zero, to L−1, or to any other permitted level.

It will be appreciated with regard to the exponential attenuator 30 of FIG. 2 that if the exponential function provided thereby is considered on a decibel scale, a linear function results. Equivalently, the geometric series of levels provided in a digital discrete level embodiment by the attenuator 30 becomes an arithmetic, equi-spaced series when considered on a decibel scale. It is furthermore appreciated that for the discrete level embodiment of the invention, the predetermined constant $\beta$ associated with the exponential attenuator 30 is the ratio between adjacent amplitude information levels.

As previously explained and expressed through Equation (2), the carrier pulser 31 of FIG. 2 provides a periodic carrier signal upon which the information levels are amplitude modulated in unipolar fashion. In the case of the sine wave carrier example shown in FIG. 2, this provides a spectral line at the sine wave frequency which simplifies timing recovery at the receiver of FIG. 3. Alternatively, however, the signal from the carrier pulser 31 may instead be bipolar or phase-reversal modulated independently of the amplitude level modulation, thereby conveying an additional bit of information during each data interval by the polarity thereof. The polarity data signal may for compatibility be in one of the standard binary recording formats. The sign of the output of the linear equalizing filter 42 of FIG. 3 would then be required to be sensed at the optimum sampling instants, for recovery of the polarity data. Timing recovery with bipolar or phase-reversal carrier modulation may be rather more complicated than when utilizing the unipolar carrier modulation previously described.

The use of a sinusoidal carrier conveniently provides a solution to a problem inherent in the employment of conventional magnetic read heads. Because such read heads work on the principle of magnetic induction, a time differentiation is imparted to the recorded flux signal as it is reproduced from the medium. In order to reconstruct the recorded signal waveform, a solution would be to integrate the signal either at the input to the write head or at the output of the read head in order to compensate for the inherent differentiation. This solution has certain complications which will be discussed shortly. The need for signal integration may be obviated by utilizing an amplitude modulated sinusoidal carrier as exemplified in FIG. 2, since the derivative of a modulated sine wave is a modulated cosine wave on which the relative information levels are preserved. In order to conserve bandwidth and further increase the data packing density, the frequency of the sinusoidal carrier may be chosen to be near the channel cut off frequency. For high recording density, one cycle of the carrier should be utilized in each data interval, and the linear equalizing filter 42 of FIG. 3 must then be suitably adjusted to ameliorate the consequent inter-symbol interference produced by the channel cut off. An adequately strong carrier spectral line should in general still exist in the data signal for timing recovery in the receiver of FIG. 3.

It has been described how in addition to the information conveyed by modulating the amplitude of the carrier signal, an additional bit per data interval may be recorded by modulating the carrier polarity. Alternatively to this use, or to the use of a sinusoidal carrier for obviating the need for signal integration in recording or playback, such carrier polarity manipulation may be employed to permit signal integration to be performed by additional apparatus within the recording or transmitting means 32 of FIG. 2. As already discussed, the purpose of such integration would be to compensate the signal differentiation inherent in conventional inductive magnetic playback. Were such integration compensation instead performed at the receiver, serious d.c.-offset and noise growth problems could arise. On the other hand, signal integration of a modulated carrier at the transmitter could in general cause the dynamic range for linear recording to be exceeded unless, as in the sinusoidal example, the carrier were restricted to contain no d.c. component. Such a d.c. prohibition could result in inefficiency of bandwidth utilization or undue equipment complexity or both.

Figure 13:
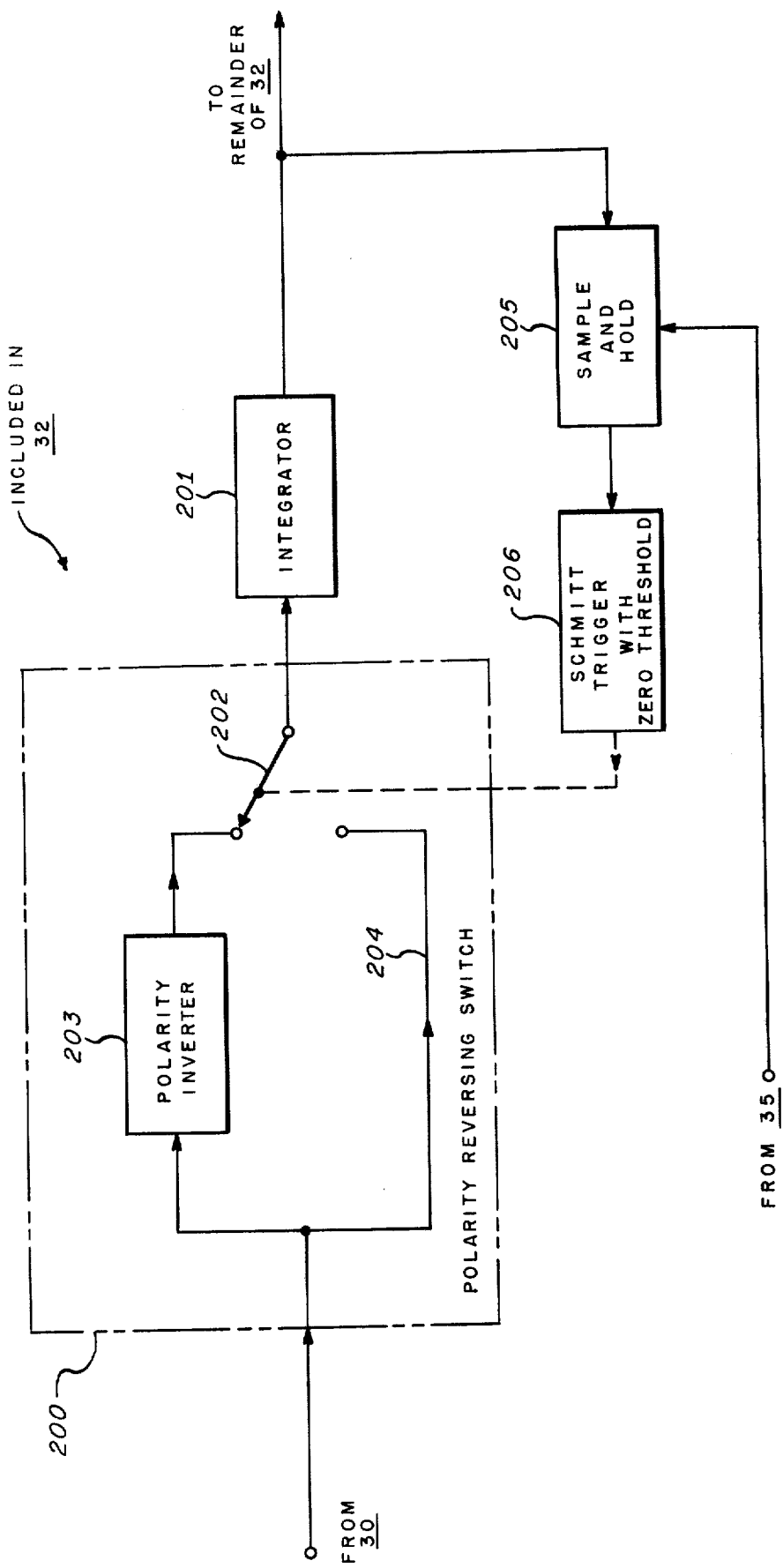
FIG. 13 is a block schematic diagram of a signal integrator for use in the recording means 32 of FIG. 2.

It is possible, however, to introduce a signal integrator into the recording means 32 of FIG. 2 while assuring that its output always remains within the linear dynamic range for any data to be recorded by employing the arrangement illustrated in FIG. 13. Referring now to FIG. 13, the unipolar-modulated carrier output from the exponential attenuator 30 is connected through a polarity reversing switch 200 to the input of a signal integrator 201 which is now included in the recording means 32 (FIG. 2). The polarity reversing switch 200 is comprised of a single-pole, double-throw switch 202, the wiper of which provides the input to the integrator 201. The two contacts of the switch 202 are connected to the exponential attenuator 30 (FIG. 2) by a conventional unity-gain polarity inverter 203 and a non-polarity-inverting path 204, respectively. Initially the integrator 201 is set to zero, and throughout the first data interval the switch 200 remains in either of its two positions, arbitrarily, while the integrator responds to its input signal. At the beginning of the second data interval, the sign of the integrator output is sensed by a sample and hold circuit 205 and a conventional Schmitt trigger circuit 206 with zero threshold which positions the polarity reversing switch 200 for that interval so as to make the net effect of the integrator input during that interval oppose the integrator level existing at its beginning. For example, assuming that the unipolar data is non-negative in character, if at the beginning of the second data interval the sign detector 205–206 senses a positive integrator output, the sign detector 205–206, via a suitable coupling, positions the wiper of the switch 202 to the polarity inverting path 203. If, however, at the beginning of the second data interval the output of the integrator 201 is negative, the sign detector 205–206 positions the wiper of the switch 202 to the non-inverting path 204 thereby achieving the result indicated. Thereby, the integrator output at the end of the second data interval is either reduced in magnitude or of opposite sign, or both, from the beginning of that interval, and in any event remains within a finite range throughout the data interval. The operation then repeats following the same rule with respect to the third and all succeeding data intervals, with the result that pure signal integration is achieved which is at all times, and for all data, compatible with the limited dynamic range of linear recording. In the arrangement just described it is the integrator output that is transmitted via the medium 33 (FIG. 2) in order to compensate the time differentiation characteristic of magnetic recording, and the timing of the sample and hold 205 is provided by the digital divider 35 of FIG. 2. Data recovery remains as already presented in connection with FIG. 3 since the effect of introducing the polarity reversing switch 200 at the input of the signal integrator 201 in recording means 32 of FIG. 2 is merely to vary, at the times that the sample and hold circuit 45 of FIG. 3 acts, the sign of the output signal from the linear equalizing filter 42 of FIG. 3. The logarithmic amplifier 43 has been described as sensitive to the absolute magnitude of the output from the linear equalizer filter 42, and thus data recovery is unaffected by the variation in sign of this output produced by the introduction of the polarity reversing switch 200 in the data recording portion of FIG. 2.

The integrator 201 may be considered a part of the shapingfiltering previously discussed with regard to the recording means 32 of FIG. 2. The integrator 201 may, in turn, be followed by further linear waveform-shaping or spectrum-shaping filters (not shown) included in means 32 for additional performance improvement in combination with the linear equalizing filter 42 of FIG. 3. Furthermore, the input-polarity-switched signal integration of FIG. 13 may be accomplished with any of a variety of modulated carrier input waveforms from the exponential attenuator 30 of FIG. 2. In particular, the carrier may be a periodic rectangular pulse of length equal to the data interval, the carrier then being identical to a constant d.c. level, in which case the output of the signal integrator is a piecewise-constant-slope, continuous function resembling an irregular hill-and-dale profile as illustrated in FIG. 14.

Figure 14:
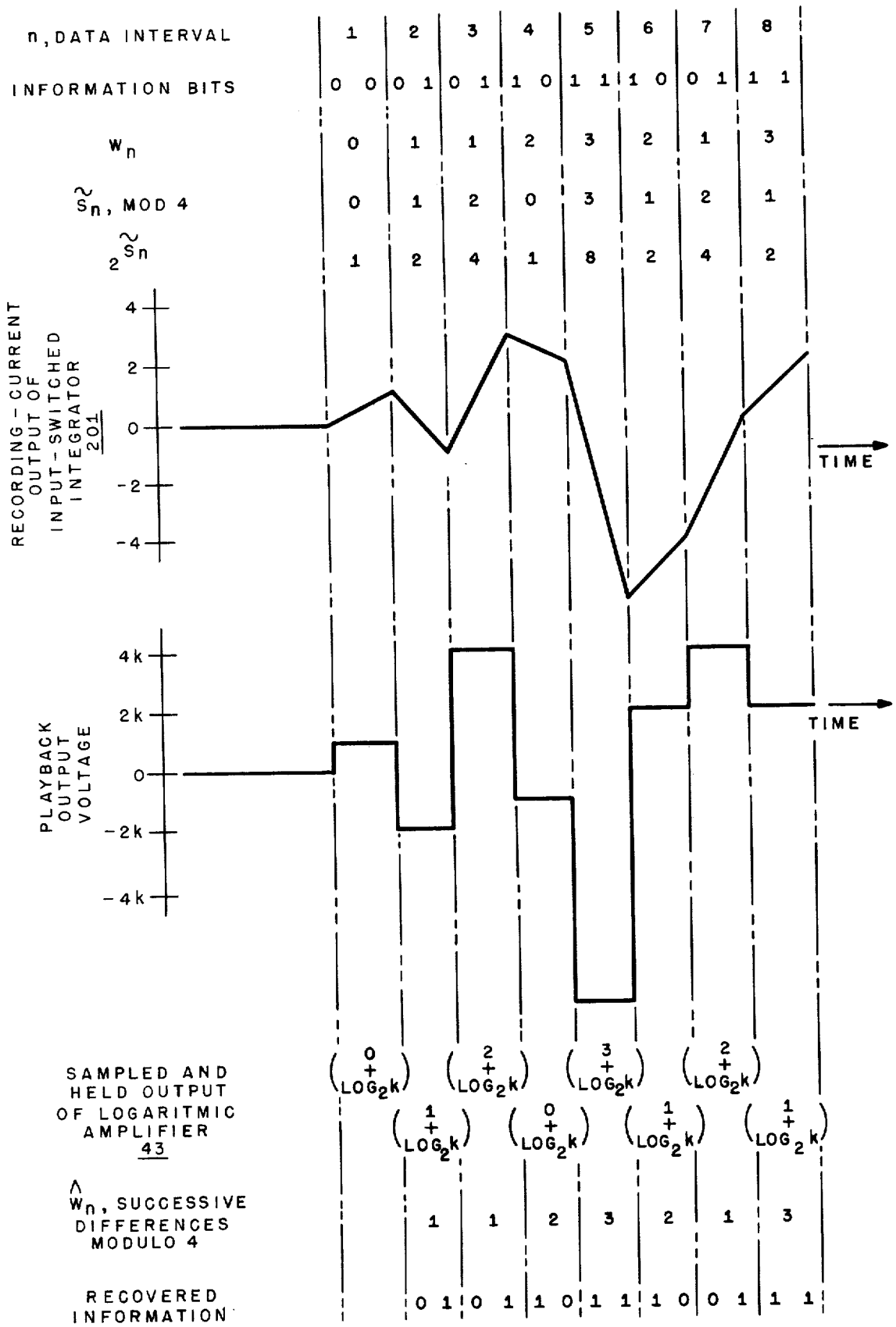
FIG. 14 is a waveform diagram useful in explaining the operation of the invention, particularly with regard to FIG. 13.

FIG. 14 illustrates an example of the irregular hill-and-dale recording waveform generated for a particular data pattern when the carrier is constant d.c. and the zero value is arbitrarily assigned to have negative sign. The playback wavefore is also shown on the assumption that there is no signal filtering in the recording channel other than that of the recording integrator 201 of FIG. 13 and the inductive magnetic playback differentiation. Also shown in FIG. 14 are the results of data conditioning by the accumulator 29 and exponential attenuator 30 of FIG. 2, for $L=4$ and $\beta=2$, with the data recovery being through the logarithmic amplifier 43 and the modulo-4 subtracter of FIG. 3, the first word being lost as earlier explained. The channel gain $k$ is seen to have no effect on the multilevel data recovery, thereby illustrating the power of the invention.

In the case of discrete level digital data, the set of recording current slope magnitudes comprises a geometric series. Alternatively to generation using the exponential attenuator 30 of FIG. 2, the polarity-switched input to the integrator 201 contained in the recording means 32 may be provided by a digital logic instrumentation which is driven by the output of the modulo-L accumulator 29 and which provides through a digital-to-analog converter an exponential function thereof. Moreover, the polarity switching may also be included in the digital logic, since the sign of the integrator output is calculable in lieu of having to observe it. Whenever the zero integrator output level may occur, its sign may be assigned arbitrarily either positive or negative with no impairment of the operation. In FIG. 13 this assignment is performed by the Schmitt trigger circuit 206 whose output has only two states.

The bandwidth conservancy of the irregular hill-and-dale recording waveform is similar to that of the modulated sinusoidal recording waveform exemplified in FIG. 2 when the frequency of the latter is located near the channel cut off frequency, and under these circumstances the linear equalizing filter 42 of FIG. 3 may well be of simpler construction for the former waveform. However, the irregular hill-and-dale recording waveform lacks a spectral line from which the timing may be recovered in the receiver of FIG. 3, while such a line is present at the datainterval frequency in the modulated sinusoidal recording. Therefore, in employing the irregular-sawtooth hill-and-dale waveform it would be necessary to introduce a spectral line for timing recovery by adding to the recording current a sine wave of appropriate frequency and sufficient amplitude.

A convenient frequency for the timing sine wave is the datainterval frequency, at which frequency the irregular hill-and-dale recording waveform and hence the playback signal has a spectral null. The playback voltage at the read head being the time derivative of the recording waveform, it thereby has an irregular-staircaselike waveform, as shown in FIG. 14, which is distributed in a geometric series of levels in the case of discrete-level digital data, and which is constant over each data interval with jumps at the interval boundaries. It will be appreciated that this playback waveform therefore interacts minimally with the recovery of the timing sine wave whose period is the data interval. Furthermore, it is known that for the d.c. carrier example of FIG. 14 the optimum linear equalizing filter 42 of FIG. 3 should include a filter having an impulse response which is a rectangle of duration equal to the data interval, and which thereby filters out the timing sine wave while still affording optimum passage of the data signal. The remainder of the equalization is then accomplished, possibly in combination with a linear shaping filter following the integrator 201 in the recording means 32 of FIG. 2 as previously described. This equalization takes into account the additive noise spectrum and all linear filtering effects in the recording and playback mechanisms and circuitry, other than the time differentiation which has already been compensated by the inclusion of the integrator 201 in the recording means 32. The output of the linear equalizing filter 42 is further processed as shown in FIG. 3 to enable multiplicative channel gain variations to be substantially reduced as previously described. It will be appreciated that there exist other rules than the above described output-sign rule for polarity-switching the input to the integrator 201 of FIG. 3 so as to maintain its output within a finite dynamic range. For example, the input sign may be caused to reverse only when it is predicted that to maintain the same signal in conveying the next data word would result in violation of an output range limit. The preceding provides alternatives to modulated sinusoidal recording in accordance with the present invention.

Figure 4:
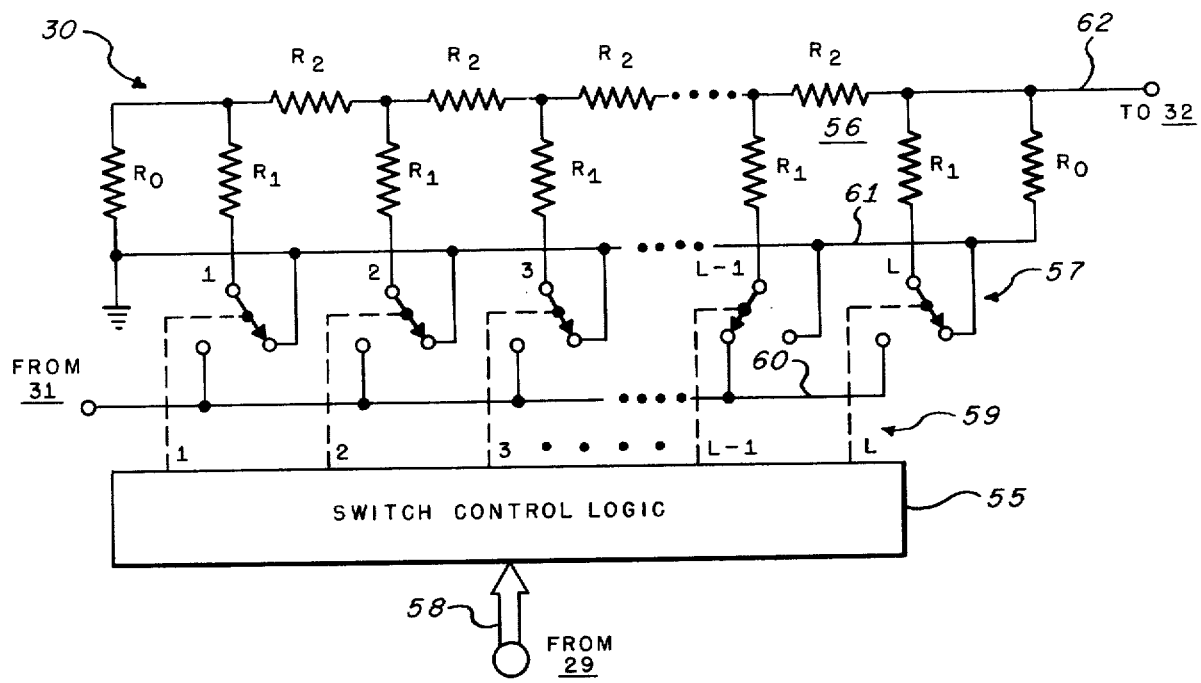
FIG. 4 is a schematic wiring diagram partially in block form of an exponential attenuator circuit useful in instrumenting a portion of FIG. 2.

Referring now to FIG. 4, an instrumentation of the exponential attenuator 30 of FIG. 2, particularly useful in the discrete level digital data embodiment of the invention, is illustrated. The exponential attenuator 30 is comprised of switch control logic circuitry 55 that controls a binary resistor ladder network 56 via a bank of single pole double throw switches 57. The switch control logic 55 receives a digital input signal on leads 58 from the accumulator 28 of FIG. 2. The switch control logic 55, in turn, provides a discrete signal on one of L output lines 59 in accordance with the binary number applied to the leads 58. For example, when the binary numbers are comprised of three bits, L will be 8 and the switch control logic 55 will energize one of the eight lines 59 in accordance with the value of the binary number on the leads 58. As is well appreciated, a three bit binary number may assume any integer value between 0 and 7. The switch control logic 55 may comprise a conventional binary decoding circuit of a type well known in the digital circuit technology. The conventional binary decoding circuit, may, for example, be of the decoder matrix type described in the textbook "Digital Computer Fundamentals" by Thomas C. Bartee, published by McGraw-Hill Book Company, Inc., 1960, pages 229–231.

The L output leads 59 are utilized to operate the L switches respectively of the switch bank 57 by means of any convenient coupling schematically illustrated by the dashed lines. One contact of each of the L switches is commonly connected to a buss 60 to receive the carrier signal from the carrier pulser 31 of FIG. 2. The other contact of each of the L switches is commonly connected to ground potential via a buss 61. The wiper of each of the L switches is connected, respectively, to a resistor of value $R_1$ of the binary resistor ladder network 56. The ladder network 56 is completed by resistors of value $R_0$ and $R_2$ as indicated by the legend. The output of the resistor network 56 is provided on a lead 62 to the recording or transmitting means 32 of FIG. 2.

In operation the switch positions are controlled by the L lines from the switch control logic 55 such that the wiper of one of the L switches is connected to the buss 60 whereas the wipers of the remaining (L−1) switches are connected to ground potential via the buss 61, the one switch being selected in accordance with the value of the binary number provided by the leads 58. In order to effect the required exponential function with $\beta > 1$, the resistor values may, for example, be related as follows:

$$R_1 = R_o/(\beta-1)$$

$$R_2 = \left(1 - \frac{1}{\beta}\right) R_o$$

where $R_o$ is selected in accordance with system requirements. Since the partial sum $\widetilde{S}_n$ from the accumulator 29 may assume the values $0, 1, 2, \ldots, (L-1)$, the line 59 which is energized is labeled $\widetilde{S}_n + 1$, so that the largest value of $\widetilde{S}_n$ provides the least attenuation. With $T_n$ defined as the ratio between the output voltage on the lead 62 and the input voltage on the buss 60 when the line controlling the $n^{th}$ switch is energized, $$T_n = [(\beta-1)/(\beta+1)]\beta^{\widetilde{S}_n+1-L}$$

It is thus appreciated that $T_n$ exhibits the desired exponential variation with respect to $\widetilde{S}_n$ to provide the geometric series of output levels hereinabove discussed.

It will be appreciated that the switches of the switch bank 57, as well as the couplings to the switch control logic 55, are schematically illustrated and would preferably be instrumented by transistor switches with electronic coupling to the circuit 55 in accordance with present day digital circuit technology.

Referring for the moment back to FIG. 2, the accumulator 29 is illustrated comprising the modulo-L adder 27 and the modulo-sum storage 28. It will be appreciated that any conventional accumulator arrangement may be utilized in instrumenting the invention. It is a requirement, however, of the system illustrated in FIG. 2 that the accumulator 29 provide steady state signals during essentially all of each data interval to the exponential attenuator 30, such that the attenuator 30 can properly develop its exponential-level output signal. Depending on the data rate of the system and the speed of the components utilized, an auxiliary storage may or may not be required. In specific instrumentations of the invention, however, careful consideration of adder delays may be necessary in order to effect proper system operation. An accumulator 29 for effecting the required modulo-L accumulation of the data words is illustrated in FIG. 5, where such delays have been taken into account.

Figure 5:
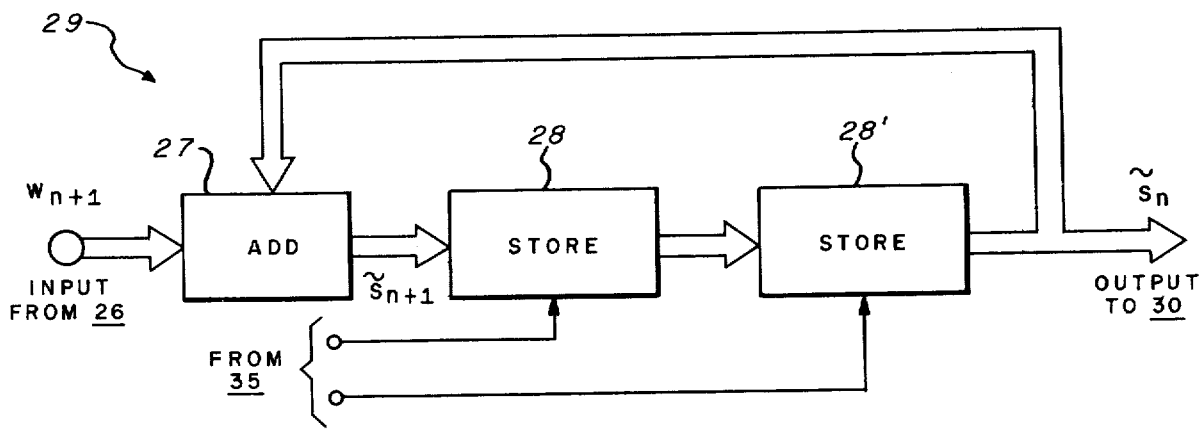
FIG. 5 is a block schematic diagram of a digital accumulator circuit useful in instrumenting a portion of FIG. 2.

Referring now to FIG. 5 in which like reference numerals indicate like components with respect to FIG. 2, the accumulator 29 is depicted for processing the data words W each having B binary digits such that $L=2^B$. The data timing indicated in the legend of FIG. 5 differs somewhat from that of FIG. 2 because the design of FIG. 5 considers the effects of adder delays which were previously omitted for simplicity in describing FIG. 2. The adder 27 responsive to the data words from the data source 26 provides its output to the storage register 28. The output from the storage register 28 is applied to the input of another auxiliary storage register 28'. The output of the storage register 28' provides the required signal to the exponential attenuator 30 as discussed with respect to FIG. 2 and, in addition, provides its output as an input to the adder 27. Since the accumulation is to be performed in modulo-L fashion, the adder 27 discards any overflow. The adder 27 and the storage registers 28 and 28' each comprise B bit devices. The storage registers 28 and 28' are additionally responsive to the timing signals from the digital divider 35 of FIG. 2.

In operation, at the beginning of the $(n+1)$ data interval and throughout its greater portion, the storage register 28' is providing the partial sum $\tilde{S}_n$ to the exponential attenuator 30 and also as an input to the adder 27. At the beginning of the $(n+1)$ interval the data source 26 provides the data word $W_{n+1}$ to the adder to be added to $\tilde{S}_n$, thereby providing the new partial sum $\tilde{S}_{n+1}$ at the output of the adder 27. After the addition has been completed but somewhat before the end of the data interval, a signal from the timing source 35 causes this new partial sum $\tilde{S}_{n+1}$ to be stored in the storage register 28. At the end of the $(n+1)$ interval another signal from the timing source 35 transfers the new partial sum from the store 28 to the store 28' thus permitting the new partial sum $\tilde{S}_{n+1}$ to control the exponential attenuator 30 during the $(n+2)$ data interval and the new data word $W_{n+2}$ to be added thereto as required.

Referring for the moment back to FIG. 3, the logarithmic amplifier 43 may specifically be realized as an operational amplifier with a transistor in the feedback path thereof. Since the base-emitter voltage of the transistor is proportional to the logarithm of the collector current thereof, a logarithmic transfer characteristic is effected by the device. Several such amplifiers are commercially procurable which have wide dynamic range, good accuracy and broad frequency response as required.

The specific instrumentations described above of the components of the data channel illustrated in FIGS. 2 and 3 have been primarily explained in terms of a discrete level digital data embodiment of the invention. However, it is appreciated that the transistor-feedback instrumentation of the logarithmic amplifier 43 is equally applicable to discrete-level or continuouslevel data. In the continuous level analog data embodiment, the data words from the source 26 may vary continuously in level from 0 to a maximum value of L, where L is not necessarily an integer. In a manner similar to the discrete level embodiment, the accumulator 29 is required to provide a running sum, modulo-L, of the analog data words.

Figure 6:
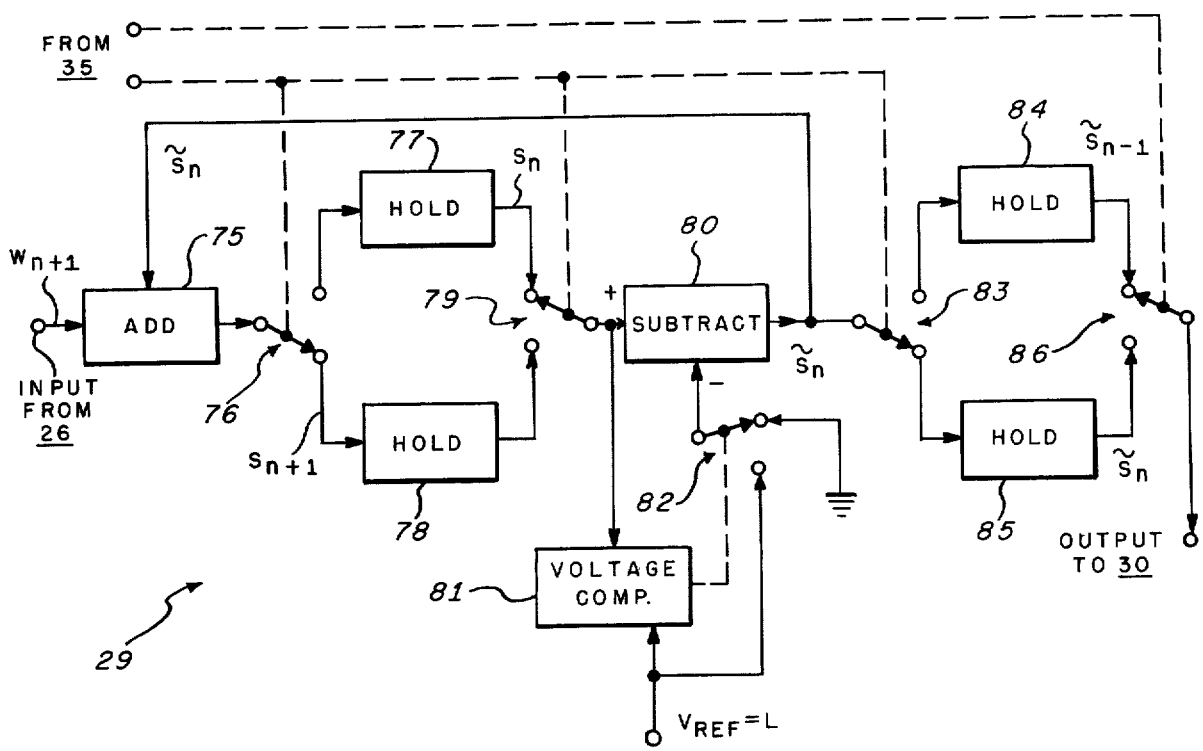
FIG. 6 is a block schematic diagram of an analog accumulator circuit useful in instrumenting a particular embodiment of FIG. 2.

Referring now to FIG. 6, an example of an instrumentation for the analog modulo-L accumulator 29 is illustrated. The analog data words from the data source 26 of FIG. 2 are applied as an input to a conventional analog voltage adder 75. The analog adder 75 provides its sum output to the wiper of a single pole double throw switch 76. The two contacts of the switch 76 are connected to the inputs of analog hold circuits 77 and 78 respectively. Each of the hold circuits 77 and 78 is of conventional design and tracks the voltage at its input by means of, for example, a capacitor when the wiper of the switch 76 is connected thereto. When the wiper of the switch 76 is disconnected from the hold circuit, the capacitor continues to provide the voltage present at the input when the contact was broken. The outputs of the hold circuits 77 and 78 are applied to the contacts of a single pole double throw switch 79 respectively. The analog output of the hold circuit 77 or 78 selected by the switch 79 is applied via the wiper thereof as the minuend input to a conventional analog subtractor circuit 80 and as an input to a conventional analog voltage comparator circuit 81. A reference voltage equal to the maximum information amplitude L is applied as a second input to the voltage comparator 81 as indicated by the legend. The output of the voltage comparator 81 is coupled by any convenient means to operate a switch 82 to selectively connect either the reference voltage L or ground potential to the subtrahend input of the subtractor 80. When the voltage on the wiper of the switch 79 is less than the reference voltage, the voltage comparator 81 positions the switch 82 to connect ground potential to the subtractor 80. When the voltage on the wiper of the switch 79 equals or exceeds the reference voltage, the voltage comparator 81 positions the switch 82 to connect the reference voltage L to the subtractor 80. In this way, the modulo-L overflows are discarded in a manner analogous to that described above with respect to the digital embodiment of the invention. The output of the subtractor 80 is applied as a second input to the adder 75 thereby performing the modulo-L accumulation required by the present invention in a manner further to be described.

In order to provide the output from the modulo-L accumulator 29 to the exponential attenuator 30 of FIG. 2 over the T-second duration of a data interval, the output of the subtractor 80 is applied to the wiper of a single pole double throw switch 83. The two contacts of the switch 83 are connected to the inputs of conventional analog hold circuits 84 and 85 respectively. The outputs of the hold circuits 84 and 85 are applied to the two contacts of a single pole double throw switch 86 respectively. The analog output of the hold circuit 84 or 85 selected by the switch 86 is applied via the wiper thereof as the input to the exponential attenuator 30 previously described with respect to FIG. 2. The operation of the switches 76, 79, 83 and 86 are controlled by the timing signals from the digital divider 35 of FIG. 2 by any convenient coupling.

The operation of the analog modulo-L accumulator 29 of FIG. 6 will now be described during the (n+1) data interval. At the beginning of the interval, the hold circuit 77 is storing the ordinary arithmetic sum $S_n$ of $W_n$ from the $n^{th}$ data interval added to the modulo-L partial sum $\tilde{S}_{n-1}$ from the $(n-1)$ data interval, while the hold circuit 84 is storing $\tilde{S}_{n-1}$. With the switches 76, 79, 83 and 86 positioned as illustrated in FIG. 6, the voltage comparator 81 is operating the wiper of the switch 82 to contact either ground potential or the reference voltage L in accordance with whether $S_n$ from the hold circuit 77 is less than L, or equal to or greater than L, respectively. Thus, the subtractor 80 is subtracting the value L from the sum $S_n$ if $S_n$ is equal to or greater than L, or is subtracting zero from $S_n$ if $S_n$ is less than L. The subtractor 80, therefore, is providing $\tilde{S}_n$, the modulo-L value of $S_n$, as an input to the adder 75 at the beginning of the (n+1) interval, and is also providing $\tilde{S}_n$ to the hold circuit 85. When the new data word $W_{n+1}$ is applied from the data source 26 early in the $(n+1)$ interval, the adder 75 adds it to the partial sum $\tilde{S}_n$ to provide the new arithmetic sum $S_{n+1}$ to the hold circuit 78.

Thus, it will be appreciated that during the (n+1) word interval, the hold circuit 84 provides the modulo-L partial sum $\tilde{S}_{n-1}$ to the exponential attenuator 30 while the next modulo-L partial sum $\tilde{S}_n$ is provided to the hold circuit 85. During this word interval the data word $W_{n+1}$ is added in conventional voltage fashion to the partial sum $\tilde{S}_n$ to form the next $S_{n+1}$ in the hold circuit 78. Near the end of the ($n+1$) data interval the switches 76, 79, 83 and 86 are energized by the timing signals from the digital divider 35 of FIG. 2 to switch to the positions opposite those illustrated in FIG. 6. Thus, the output of the adder 75 is then connected to the hold circuit 77 and the analog value $S_{n+1}$ in the hold circuit 78 is applied to the minuend input to the subtractor 80 and to the voltage comparator 81. The output of the subtractor 80 is then applied as the input to the hold circuit 84 and also as an input to the adder 75, while the voltage comparator 81 in combination with the switch 82 acts to make the subtractor output equal to $\overline{S}_{n+1}$, the modulo-L value of its input. The switch 86 is now positioned to provide to the exponential attenuator 30, during the ($n+2$) interval, the output $\overline{S}_n$ of the hold circuit 85 which is the next occurring modulo-L partial sum as required, while the following partial sum $\overline{S}_{n+1}$ is being formed.

In order to assure that the proper values of $S_{n+1}$ and $\overline{S}_n$ are held, the switches 76 and 83 should be energized just prior to the end of the data interval and before the new data word arrives. Switch 86 should be energized just before switch 83 and switch 79 may be energized concurrently with switches 76 and 83. Thus, the switches 76, 79 and 83 are illustrated ganged together, with switch 86 driven separately. It will be appreciated that the switches 76, 79, 82, 83 and 86 and their associated couplings are schematically illustrated and would preferably be instrumented by electronic transistor switches. The circuits 75-86 should be sufficiently fast so that all levels settle to their final values by the end of each data interval.

It will be appreciated that since $W_k$ at the input to the adder 75 does not exceed L for any k, and since any $\overline{S}_{k-1}$ is less than L, any $S_k$ at the output of the adder 75 is less than 2L. Thus any $\overline{S}_k$ from the output of the subtractor 80 is less than L as required. However, it may be noted that $W_k=0$ and $W_k=L$ both produce the same output value for $\overline{S}_k$. Unless this ambiguity is permissible as in, for example, the transmission of angular information where L=360°, it would be necessary to establish a margin slightly less than L and above which the analog data level would be prohibited.

It is appreciated from the foregoing that in order to provide maximum settling time for the circuits 75-86 of the analog modulo-L accumulator 29 a delay of two word times of the output of the accumulator 29 with respect to the input thereof is provided in the modulo-L accumulation of the analog words. Alternatively, in systems where the data rate permits and sufficiently fast circuits are utilized, hold circuits 77, 78, 84 and 85, as well as the switches 76, 79, 83 and 86, may be eliminated with the output of the adder 75 being provided directly to the minuend input of the subtractor 80 whose output then directly provides the input to the exponential attenuator 30. In this simpler configuration which is essentially that of the accumulator depicted in FIG. 2, an analog delay circuit providing a delay of one data interval, which may be instrumented for example by a conventional delay line, would be required in the path from the subtractor 80 output to the partial-sum input of the adder 75 in a manner similar to that discussed with respect to FIG. 2.

Figure 7:
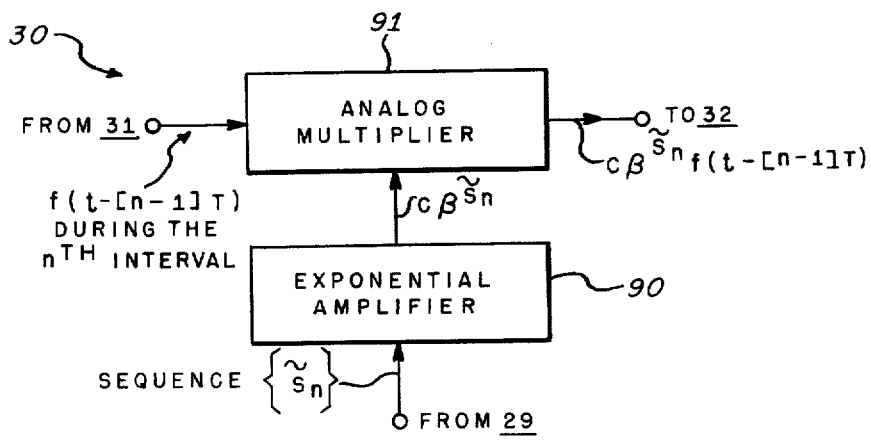
FIG. 7 is a block schematic diagram of an analog amplitude modulator useful in instrumenting an embodiment of FIG. 2.

The output of the analog modulo-L accumulator 29 illustrated in FIG. 6 is applied to the exponentiating circuit 30 which in the analog embodiment of the invention may be configured in the manner illustrated in FIG. 7. Referring now to FIG. 7, the sequence of analog partial sums $\{\overline{S}_n\}$ from the modulo-L accumulator 29 is applied to an exponential amplifier 90. The exponential amplifier 90 has a continuous input-output characteristic in contrast to the discrete set of grains provided by the exponential attenuating network illustrated in FIG. 4. The exponential amplifier 90 may, for example, be instrumented by a conventional feedback rearrangement of the circuitry utilized in the logarithmic amplifier 43 of FIG. 3 previously discussed. Such devices are commercially procurable from numerous manufacturers of electronic circuits.

The output of the exponential amplifier 90 is applied as an input to a conventional analog multiplier 91. Circuits suitable for instrumenting the analog multiplier 91 are readily commercially procurable from manufacturers of electronic circuits. The other input is provided by the carrier signal from the carrier pulser 31 of FIG. 2. The analog multiplier 91 provides its output signal to the recording or transmitting means 32 of FIG. 2 as required.

In operation the exponential amplifier 90 provides a piecewise-constant output that is proportional to an exponential function, with respect to the predetermined constant $\beta$, of the piecewise-constant accumulator 29 output sequence $\{\overline{S}_n\}$. Thus the output of the exponential amplifier 90 during the $n^{th}$ interval may be designated as $C\beta^{\overline{S}_n}$ as indicated by the legend.

The piecewise-constant exponential function from the amplifier 90 amplitude modulates the carrier pulse $f(t-[n-1]T)$ in the multiplier 91 thereby providing during the $n^{th}$ interval, as indicated by the legend, the signal to the recording or transmitting means 32 of FIG. 2 as required.

Alternatively, the embodiment of FIG. 7 could be employed for discrete level digital data by coupling a digital to analog converter to the output of the digital version of the accumulator 29 of FIG. 2 and applying the output of the converter to the exponential amplifier 90 of FIG. 7.

Figure 8:
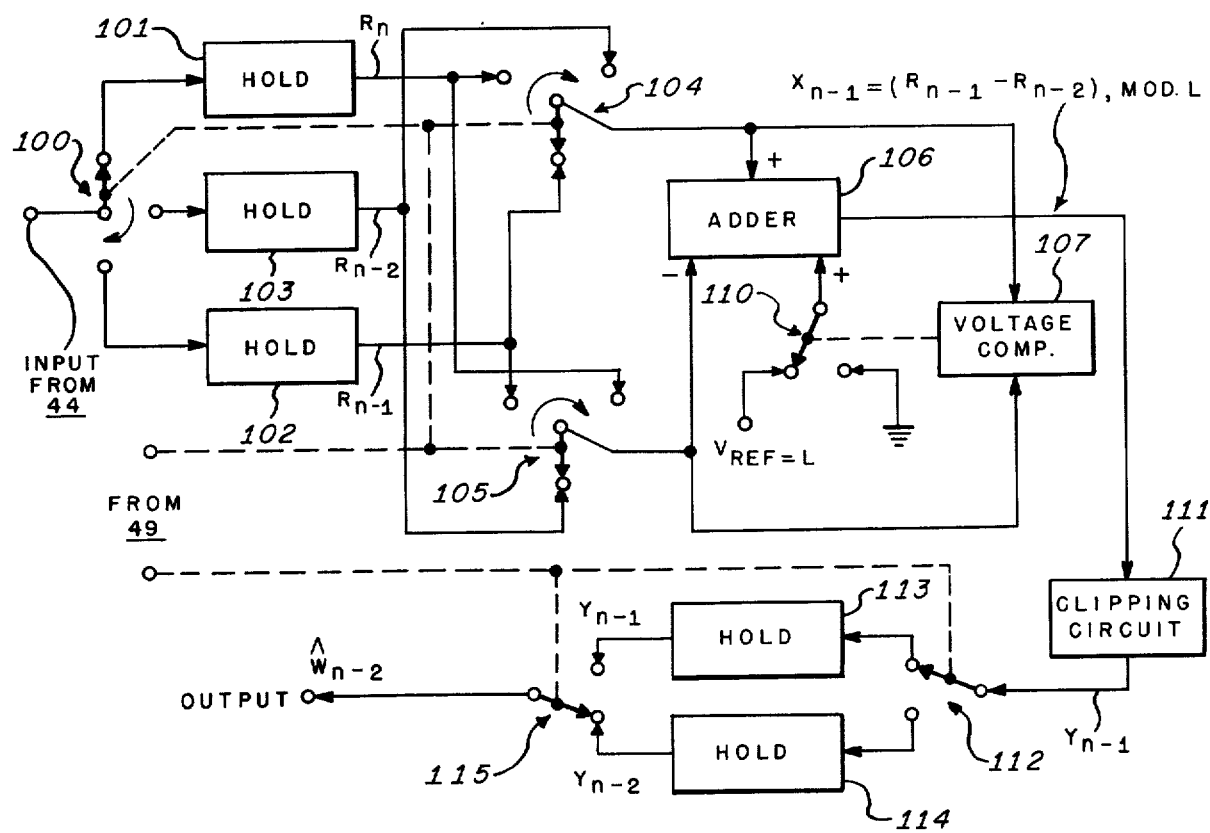
FIG. 8 is a block schematic diagram useful in instrumenting a portion of an analog version of FIG. 3.

In the analog embodiment of the reproducing or receiving portion 40 of FIG. 3, the combination of the sample and hold circuit 45, the two word memory 46, and the modulo-L subtractor 47 may conveniently be instrumented in the manner illustrated in FIG. 8. Referring now to FIG. 8, the equalized and logarithmically converted signals from the log $\beta$ divider 44 of FIG. 3 are applied to the wiper of a three position switch 100. The three contacts of the switch 100 are connected to the inputs of conventional analog hold circuits 101, 102 and 103 respectively, which may be similar to the hold circuit 77 previously discussed with respect to FIG. 6. One of the hold circuits 101-103 is utilized to track the present input signal while the remaining two circuits are holding the two previously received signal samples $R_{n-1}$ and $R_{a\ n-2}$ respectively. The outputs of the hold circuits 101-103 are connected to the three contacts of a three position switch 104 and in parallel to the three contacts of a three-position switch 105 respectively. The wipers of the switches 100, 104 and 105 are ganged such that when one of the hold circuits 101-103 is tracking the present input, the remaining two hold circuits provide their held signals to the wipers of the switches 104 and 105 respectively.

The wipers of the switches 104 and 105 are connected respectively to the inputs of a conventional analog adder 106 and a conventional analog voltage comparator 107. The wiper of the switch 104 is connected to the positive input of the adder and the wiper of the switch 105 is connected to the negative input thereof. The adder 106 thus arithmetically subtracts the voltage on the wiper of the switch 105 from the voltage on the wiper of the switch 104.

The output of the voltage comparator 107 is coupled by any convenient means to control the wiper of a single pole double throw switch 110. The two contacts of the switch 110 are connected to a source of reference voltage equal to the maximum information amplitude L and to ground potential respectively. the voltage comparator 107 operates to connect the wiper of the switch 110 to ground potential when the potential from the wiper of the switch 104 is greater than or equal to the potential from the wiper of the switch 105. When, however, the potential on the wiper of the switch 104 is less than the potential on the wiper of the switch 105, the voltage comparator 107 causes the wiper of the switch 110 to be connected to the reference potential.

The wiper of the switch 110 is in turn connected to a third and positive input to the adder 106. Thus, depending on the relationship between the voltages applied to the voltage comparator 107, the switch 110 is effective to add 0 or L volts to the computations being performed by the adder 106 for reasons to be discussed.

The amount of the adder 106 is applied to a conventional clipping circuit 111 which limits the input levels thereto of less than 0 and greater than L volts to provide an output of 0 and L volts respectively. For signals between the clipping levels of 0 and L volts the clipping circuit 111 provides unity gain for reasons to be discussed.

The output of the clipping circuit 111 is applied to the wiper of a single pole double throw switch 112 whose two contacts are connected to the inputs of conventional analog hold circuits 113 and 114 respectively. The outputs of the hold circuits 113 and 114 are applied to the two contacts of a single pole double throw switch 115 whose wiper provides the output of the system.

The wipers of the switches 100, 104 and 105 are ganged together for simultaneous operation and are connected to be energized by the timing generator 49 of FIG. 3 by any convenient coupling. In a similar manner the switches 112 and 115 are so coupled to the timing generator 49.

The operation of the circuits of FIG. 8 will now be described. During the $n^{th}$ interval of data reception and with the switches 100, 104, 105, 112 and 115 in the positions illustrated in FIG. 8, the hold circuit 101 is tracking the received analog signal while the hole circuits 102 and 103 are holding the two preceding samples of the received signal $R_{n-1}$ and $R_{n-2}$ respectively. The adder 106 and the voltage comparator 107 perform the modulo-L subtraction of the held signals $R_{n-1}$ and $R_{n-2}$. $R_{n-1}$ is applied to the positive input of the adder 106 via the switch 104 and $R_{n-2}$ is applied to the negative input thereof via the switch 105. The comparator 107 determines whether or not $R_{n-1}$ is greater than or equal to $R_{n-2}$. If $R_{n-1} \geq R_{n-2}$, the difference $R_{n-1} - R_{n-2}$ is the modulo-L difference required. In this instance the comparator 107 controls the switch 110 so that 0 volts is applied to the third input to the adder 106. If, however, $R_{n-1} < R_{n-2}$, the modulo-L subtraction required is $R_{n-1} - R_{n-2} + L$ so that in this instance the comparator 107 causes the switch 110 to apply the reference voltage L to the third input of the adder 106. Thus, under either condition, the output of the adder 106 is the proper modulo-L difference between $R_{n-1}$ and $R_{n-2}$ which is designated as $X_{n-1}$ as indicated by the legend.

The operation of the circuit of FIG. 8 has been heretofore discussed under the assumption of a noise free environment in which the difference $R_{n-1} - R_{n-2}$ is between $-L$ and $+L$ volts. A noise burst, however, can cause the difference to be outside this range which would cause $X_{n-1}$ to be outside the range from 0 to L volts. In order to generate an output $Y_{n-1}$ as indicated by the legend, which is within the noise free range of the system, the signal $X_{n-1}$ is processed through the clipping circuit 111 in the manner previously described. The output of the clipping circuit 111 is applied to the hold circuit 113 through the switch 112. The other hold circuit 114 is storing the previous signal from the clipper $Y_{n-2}$ which is the output $\hat{W}_{n-2}$ providing the estimate of the transmitted word $W_{n-2}$ as previously described.

During the time required to utilize the estimate $\hat{W}_{n-2}$ stored in the hold circuit 114, the switches 100, 104, 105, 112 and 115 remain in the positions illustrated in FIG. 8. While this output is being utilized, the input from the log $\beta$ divider 44 of FIG. 3 is varying and the hold circuit 101 is tracking this signal. At the optimum sampling instant previously discussed with respect to the linear equalizing filter 42 of FIG. 3, the switch 100 is rotated one position clockwise by the timing generator 49 of FIG. 3. The hold circuit 101 now stores the sample $R_n$ and the hold circuit 103 begins to track the input signal. However, just prior to when the switch 100 changes position at the optimum sampling instant, the wipers of the switches 112 and 115 are switched to the positions opposite those illustrated in FIG. 8 by the timing signal from the timing generator 49. The switches 112 and 115 are so operated to insure that the signals into the adder do not change before $Y_{n-1}$ is properly held.

Simultaneously with the rotation of the switch 100, the switches 104 and 105 are rotated one position clockwise from the position illustrated in FIG. 8. The adder 106 then computes $X_n$ while the estimate $\hat{W}_{n-1}$ of the next word is being provided at the output of the device. Thus, each estimate is available for a time equal to the word duration minus the sum of the switching times for the switches 112 and 115. During succeeding word intervals the operations described are repeated. It is appreciated that, in a manner similar to that described above with respect to the analog recording or transmitting portion 25 of FIG. 2, there is a delay of two word intervals between the input and the output of FIG. 8.

It will be appreciated that the switches 100, 104, 105, 110, 112 and 115 and the couplings thereto are schematically illustrated and would preferably be instrumented by electronic transistor switches. It is furthermore appreciated that for appropriate system data rates and sufficiently fast components, the switches and the hold circuits 100–105 and 112–115 may be eliminated, with the $R_{n-1}$ and $R_{n-2}$ inputs to the adder 106 and the voltage comparator 107 then being provided by the two word memory 46 of FIG. 3 and the clipping circuit 111 providing the output of the system.

From the foregoing discussions with regard to FIGS. 1–8, it will be appreciated that the accumulator 29 of FIG. 2, specific instrumentations of which are illustrated in FIGS. 5 and 6, comprises the data preconditioning means 12 of FIG. 1. It is, furthermore, appreciated that the modulo-L subtractor 47 of FIG. 3 and the associated sample and hold circuit 45 and two word memory 46, of which a specific embodiment thereof is illustrated in FIG. 8, comprise the data restoration means 18 of FIG. 1. Although the embodiment of the invention illustrated in FIGS. 2-8 is explained in terms of the modulo-L accumulator 29 of FIG. 2 and the modulo-L subtractor 47 of FIG. 3, other data preconditioning and restoration means may be utilized in practicing the invention. The general properties that the data preconditioning means 12 and the data restoration means 18 of FIG. 1 should possess to practice the present invention are described above with respect to FIG. 1. Numerous other instrumentations for these means will be described in detail later with regard to the further embodiments of the invention illustrated in FIGS. 9-12.

Several alternative arrangements for the data preconditioning means 12 and the data restoration means 18 of FIGS. 1-8 will now be described. It is appreciated that the specific data preconditioning means 12 and the data restoration means 18 of FIG. 1 embodied using the modulo-L accumulator 29 of FIG. 2 and the modulo-L subtractor 47 of FIG. 3 are particularly suitable for reducing multiplicative distortions of a slowly varying nature such that the multiplicative gain variations from one data word to the next are substantially constant. This is so because the subtractor 47 provides the first differences between the logarithms of successive signals reproduced or received by the reproducing or receiving portion 40 of the data channel as shown in FIG. 3, and the operation of the accumulator 29 is inverse to that of the subtractor 47.

The embodiment of FIGS. 2-8 has been explained in terms of reducing slowly varying, locally almost constant multiplicative distortions. However, the concepts of the invention are equally applicable to reducing other types of distortion such as, for example, a locally exponentially growing or diminishing type of multiplicative distortion which then appears as additive, locally linearly varying distortion at the output of the logarithmic converter in the receiver. This type of varying distortion may efficaciously be reduced by configuring the data preconditioning means 12 of FIG. 1 to provide second partial sums of the input data and configuring the data restoration means 18 of FIG. 1 to take the second differences of the received signals. Such a data preconditioning instrumentation may be realized by applying the first partial sum output of the accumulator 29 of FIG. 2 to a second module-L accumulator whose output is then applied to the exponential attenuator 30, thereby providing second partial sums of the data items. The second-difference data restoration means 18 may be instrumented by applying the output of the modulo-L subtractor 47 of FIG. 3 to a second two word memory whose two outputs would be applied to a second modulo-L subtractor. Thus the second differences of the sequence of received signals are provided with the exponentially varying multiplicative distortion removed therefrom. In a similar manner, higher order multiplicative distortions may be removed by generating higher order partial sums from the data preconditioning means 12 of FIG. 1 and providing corresponding higher order differences in the data restoration means 18.

It will be appreciated that when utilizing modulo arithmetic operations in instrumenting the data preconditioning means 12 and the data restoration means 18 of FIG. 1, the data items provided by the data source 11 must be unipolar, i.e., either non-negative or non-positive. When non-negative data is utilized and positive accumulation is performed by the accumulator 29 of FIG. 2, modulo overflow will occur as previously described with respect to FIGS. 2-8. Modulo overflow will also occur when the data items are nonpositive and negative accumulation is performed by the accumulator 29. When, however, non-negative data and negative accumulation are utilized, or non-positive data and positive accumulation are utilized, modulo underflow will occur in the accumulator 29. It will be appreciated that in those embodiments where modulo underflow occurs in the recording or transmitting portion 25 of FIG. 2, the modulo-L subtraction performed by the subtractor 47 of FIG. 3 should be effected in the reverse order to that described hereinabove with respect to FIG. 3. In all cases, the output from the receiver of FIG. 3 will be a sequence of estimates of the magnitudes of the input data, loss of the data sign being either of no consequence or simply remedied. It will further be appreciated that operation with non-positive data items and a $\beta > 1$ is basically equivalent to operation with non-negative data items and a $\beta < 1$.

It will be appreciated from the foregoing descriptions of the embodiment of the invention in FIG. 2 that modulo overflow or underflow accumulations are performed so that the signal provided by the exponential attenuator 30 to the recording or transmitting means 32 does not exceed the dynamic range of the system. The concepts of the present invention, however, are equally applicable to data preconditioning means and data restoration means that do not involve modulo overflow or underflow operations. For example, accumulation without modulo overflow or underflow may be utilized in the recording or transmitting portion 25 of FIG. 2, provided that substraction without modulo overflow or underflow is then used in the reproducing or receiving portion 40 of FIG. 3. In such embodiments it is desirable to utilize bipolar data so as to minimize the possibility of exceeding the system's dynamic range.

It will be appreciated from the foregoing discussion that the data restoration means 18 of FIG. 1 comprises a filter for filtering the multiplicative distortions from the processed signals after they have been converted to additive distortions by the logarithmic converter means 17. Furthermore, it will be appreciated that the dataa preconditioning means 12 comprises a filter inverse to the data restoration filter 18. For the discrete level, discrete time embodiment of the invention hereinabove described, these filters 12 and 18 may be broadly categorized as invertible automata having inverse input-output relationships with respect to each other of the type described in the paper by S. Even, "On Information Lossless Automata of Finite Order" appearing in the Aug. 1965 I.E.E.E. Transactions on Electronic Computers on page 561, or in the W.R. Ashby et al. book, "Automatic Studies" published by the Princeton University Press of Princton, N.J., in 1956. It is, of course, appreciated that the modulo-L digital accumulator 29 of FIG. 5, and the modulo-L digital subtractor 47 of FIG. 3 with its associated two word memory 46, are examples of such automata.

The heretofore described embodiments of the invention are explained in terms of increasing the packing density or data transmission density for a data recording or transmission channel, using a single modulated carrier signal in the channel. The data packing density may also be increased, utilizing the teaching of the present invention, by incorporating the well known concept of signal multiplexing, in which multiple, separable modulated carriers are transmitted through the channel. For example, in multiplexing by quadrature amplitude modulation, two data recording or transmitting portions 25, such as illustrated in FIG. 2, would be utilized. The carrier pulser 31 of one such portion would provide a sinusoidal carrier and the carrier pulser of the other portion would provide a cosinusoidal carrier. The output voltages from the two recording or transmitting means 32 in each portion would be added and the resultant sum recorded or transmitted on the medium 33. Since the two modulated carrier signals are orthogonal to each other, they may be separated one from the other by well known techniques, thereby separating the individual data that was separately impressed on the two carriers. Two data reproducing or receiving portions 40 such as illustrated in FIG. 3, would then be utilized to independently process the two separated carriers and thereby recover all of the transmitted data with multiplicative distortions substantially filtered therefrom.

As another example of signal multiplexing employing the invention, conventional time multiplexing may be utilized. Here, a plurality of data recording or transmitting portions 25 such as illustrated in FIG. 2 would operate in combination with a corresponding plurality of respective reproducing or receiving portions 40 such as illustrated in FIG. 3, where the data timing among the transmitting portions would be uniformly staggered and the timing of the receiving portions would be respectively synchronized thereto. The output voltages from the recording or transmitting means 32 in each portion would be added and the resultant sum applied to the medium 33. Alternatively, a single carrier pulser 31 and exponential attenuator 30 could be employed, with the accumulator input to the latter commuted among a plurality of accumulators 29 or supplied by a digitally instrumented equivalent driven by the plurality of data inputs. Correspondingly, for example, elements 41–44 and 48–49 of the receiving portion 40 of FIG. 3 could appear singly in the time-multiplex receiver, with the timing generator 49 supplying a multiplicity of properly synchronized timing singals to a plurality of sample and hold circuits 45 and associated separate analog-to-digital converters. The analog-to-digital converter outputs would be respectively supplied to separate digital two-word memories 46 and modulo-L subtracters 47, or to a digitally instrumented equivalent, from which the separately conveyed data inputs would be recovered in the manner previously described. Provided that the multiplicative distortions of the data channel are slow relative to the amplitude-modulation period of an individual data stream, they will be substantially reduced in the recovered data. A possible benefit of such time-multiplex operation is that it would facilitate the use of a plurality of relatively slow analog-to-digital converters in place of a single high speed one. This could result in a possible net cost saving, since in the higher speed ranges the cost rises more steeply than the conversion rate. Moreover, the time multiplexed operation is tolerant of slow but independent d.c. offset drifts among the plurality of sample and hold circuits and associated analog-to-digital converters, which drifts may be characteristic of inexpensive apparatus.

The embodiments of FIGS. 2 and 3 have been discussed with respect to a carrier signal which has an integer number of periods in each data modulation interval. It will be appreciated that this is not a necessary restriction when the carrier signal is at a high frequency relative to the data interval rate as in high frequency radio communications. In such situations, a conventional envelope detection circuit would be introduced between the linear equalizing filter 42 of FIG. 3 and the logarithmic amplifier 43. The timing generator 49 would then be driven by synchronization means responsive to the envelope detector output in a manner well known in the art, but carrier polarity modulation could not be utilized.

Figure 9:
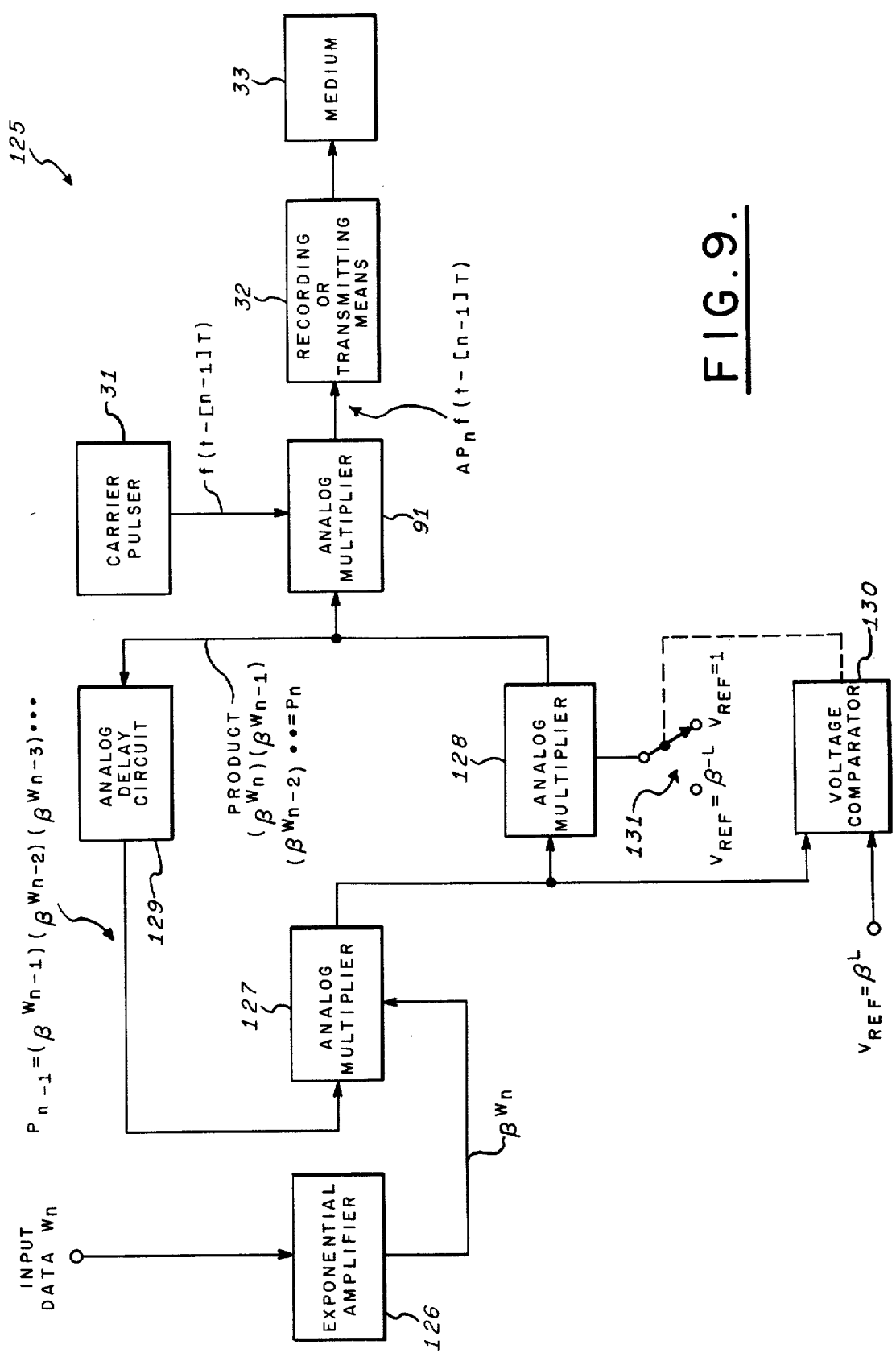
FIG. 9 is a block schematic diagram of the data recording or transmitting portion of another preferred embodiment of the invention.
Figure 10:
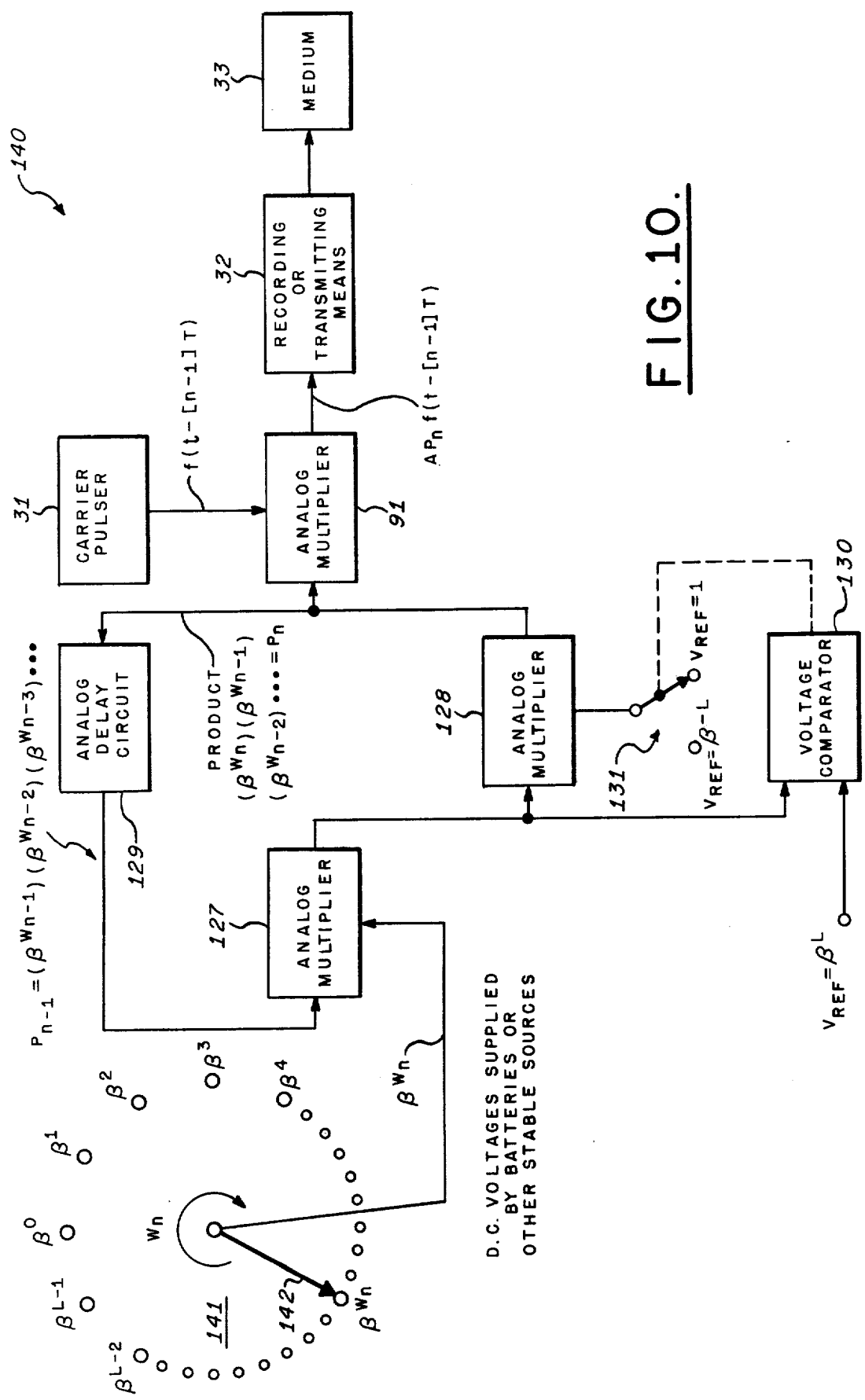
FIG. 10 is a block schematic diagram of the data recording or transmitting portion of still another preferred embodiment of the present invention.
Figure 11:
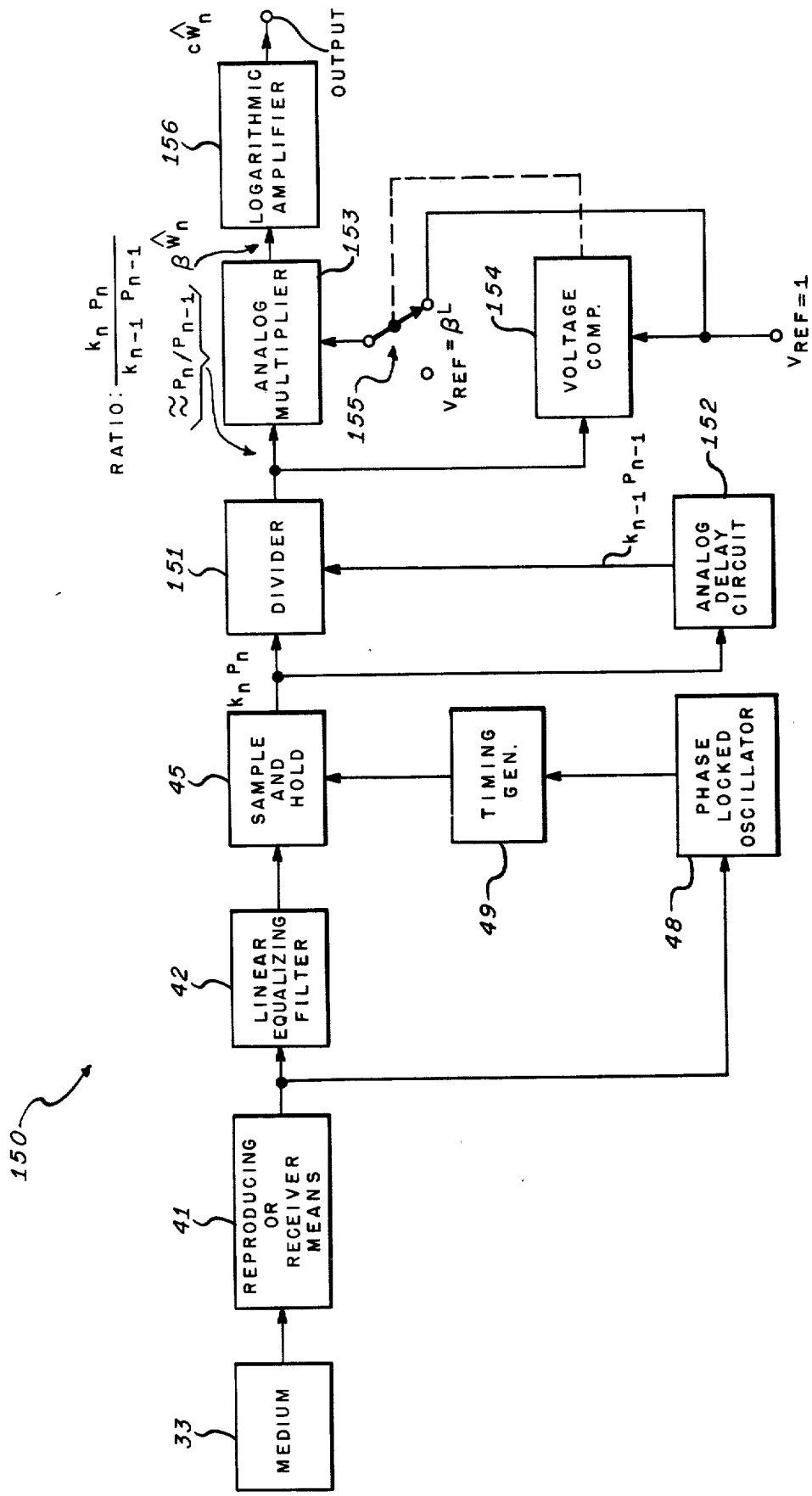
FIG. 11 is a block schematic diagram of the data reproducing or receiving portion of the embodiments whose recording or transmitting portions are depicted in FIGS. 9 and 10.

The foregoing embodiments of the invention have been explained in terms of recording on or transmitting through a medium a signal derived by generating the running cumulative sum of a sequence of data items and taking an exponential function thereof. The original data is recovered by logarithmically converting the reproduced or received signals from the medium and taking successive differences thereof. It will be appreciated with regard to the data recording or transmitting portion of the data channel that taking the exponential function of the sum of the data items is mathematically equivalent to taking an exponential function of the data items themselves and generating a running cumulative product of these exponentially converted data items. It is, furthermore, appreciated with regard to the reproducing or receiving portion of the data channel that taking successive differences of the logarithmically converted received signals is mathematically equivalent to obtaining the ratios between successively received signals and then taking the logarithms thereof. In accordance with these mathematical equivalents another embodiment of a data channel in accordance with the present invention is illustrated in FIGS. 9–11. It will be appreciated that the data channel of FIGS. 9–11 is adapted for processing discrete time data of either a discrete level digital nature or a continuous level analog nature.

Referring now to FIG. 9 in which like reference numerals indicate like components with respect to FIGS. 2 and 7, the data recording or transmitting portion 125 of the data channel is depicted. The sequence of input data items $W_n$ is applied as voltage levels to the input of an exponential amplifier 126. The exponential amplifier 126 is of conventional design of the type heretofore described with respect to FIG. 7. The amplifier 126 provides signals representative of the predetermined constant $\beta$ raised to powers respectively equal to the data items $W_n$ as indicated by the legend.

The sequence of voltages $\{\beta w_n\}$ from the exponential amplifier 126 is applied as an input to a conventional analog multiplier 127 of the type heretofore described with respect to FIG. 7. The output of the multiplier 127 is applied via a similar analog multiplier 128 to an analog delay circuit 129 which provides a delay of one data interval. The day circuit 129 may be a conventional delay line or may be of the switch-and-hold variety of the type previously described with respect to FIGS. 6 and 8. The output of the delay circuit 129 is applied as a second input to the multiplier 127.

The output of the multiplier 127 is additionally applied as an input to a voltage comparator 130 which has as a second input a reference voltage equal to the constant $\beta^L$. The output of the voltage comparator 130 is effective to position the wiper of a single pole double throw switch 131 by any convenient coupling. The two contacts of the switch 131 are connected to a reference potential equal to the constant $\beta^{-L}$ and to another reference potential equal to unity respectively. The wiper of the switch 131 provides a second input to the analog multiplier 128. When $\beta>1$ and the voltage from the multiplier 127 is less than the reference potential $\beta^L$, the voltage comparator 130 connects the wiper of the switch 131 to the unity reference potential. When, however, $\beta>1$ and the output of the multiplier 127 is equal to or greater than the reference potential $\beta^L$, the voltage comparator 130 positions the wiper of the switch 131 to the $\beta^{-L}$ reference potential. In this manner, modulo multiplication is achieved with respect to the exponent L in a manner to be discussed. The multiplier 127 and the modulo devices comprised of the multiplier 128, the voltage comparator 130 and the switch 131, together with the delay circuit 129, form a cumulative modulo multiplier for providing the cumulative product of the exponentiated sequence of data words $\{W_n\}$ in a manner to be explained.

The cumulative product output from the analog multiplier 128 is applied as an input to a further analog multiplier 91 that also receives a carrier signal input from the carrier pulser 31. The carrier pulser 31 and the analog multiplier 91 may be substantially the same as that described above with respect to FIG. 7. The cumulative product signal from the multiplier 128 amplitude modulates the carrier signal from the pulser 31 in the analog multiplier 91. The amplitude modulated carrier signal is applied to the medium 33 via the recording or transmitting means 32 in the manner described above with respect to FIG. 2.

In operation the output of the delay circuit 129 is initially set to a convenient value such as unity. Thereafter, the delay circuit 129 provides, with a delay of one data word interval, the successive values of the cumulative product $P_n$ from the multipliers 127 and 128 as indicated by the legend. Each successive exponentiated data word $\beta^W$ is multiplied by the delayed cumulative product $P_{n-1}$ in the multiplier 127 to provide the new input to the multiplier 128.

The cumulative product $P_n$ from the analog multiplier 128 is obtained in modulo fashion with respect to the exponent L in the following manner. $\beta_L$ is representative of the upper limit of the dynamic range of the system. Whenever $P_n$ is less than $\beta^L$, the voltage comparator 130 causes the switch 131 to connect the unity reference voltage to the analog multiplier 128. Thus in this case the cumulative product generated in the multiplier 127 is unaffected. When, however, the output of the multiplier 127 equals or exceeds the level $\beta^L$, the voltage comparator 130 causes the switch 131 to connect the reference potential $\beta^{-L}$ to the multiplier 128. Thus, if the cumulative product equals or exceeds $\beta^L$, the product is multiplied by $\beta^{-L}$ thus providing the modulo operation with respect to the value of the cumulative product which remains within the dynamic range of system. For example, if the cumulative product is just below $\beta^{2L}$, multiplying this product by $\beta^{-L}$ reduces the value of the cumulative product back to just below $\beta^L$ which is within the dynamic range of the system. Thus, the analog multiplier 128, the voltage comparator 130, and the switch 131 are effective in performing modulo multiplication with respect to the exponent L.

The above discussion and description of the recording or transmitting portion 125 of FIG. 9 was based on the assumption that the predetermined constant $\beta$ is greater than unity. When, however, $\beta$ is a positive constant less than unity, the operation of the voltage comparator 130 and the switch 131 with respect to the reference voltages must be modified. Under this condition whenever the output from the multiplier 127 is less than or equal to $\beta^L$, the switch 131 is positioned to connect the reference voltage $\beta^{-L}$ to the multiplier 128. When, however, the output from the multiplier 127 is greater than $\beta^L$, the switch 131 is connected to the source of unity reference potential. In this manner, modulo multiplication with respect to the exponent L is again achieved, while the cumulative produce $P_n$ is maintained above the noise level of the system and within the operable dynamic range thereof.

In a manner similar to that described with respect to the embodiments of FIGS. 1–8, when the modulo arithmetic operation, such as in this instance multiplication, is utilized the input data words $W_n$ should be unipolar in character. The concepts of the embodiment of the invention illustrated in FIG. 9 are, however, equally applicable to non-modulo multiplication. The circuitry illustrated in FIG. 9 may be modified to perform non-modulo multiplication by connecting the output of the multiplier 127 directly to the amplitude modulator 91 and the delay circuit 129, thus eliminating the analog multiplier 128, the voltage comparator 130 and the switch 131. In this embodiment the input data word $W_n$ should be bipolar in character so as to minimize the possibility of exceeding the dynamic range of the system.

It will be appreciated that timing circuits of the nature illustrated in FIG. 2 may be utilized in the circuits of FIG. 9 and have not been shown for simplicity.

Referring now to FIG. 10 in which like reference numerals indicate like components with respect to FIG. 9, there is illustrated an alternative embodiment of a data recording or transmitting portion 140 of a data channel instrumented in accordance with the mathematical equivalences previously discussed. The embodiment 140 of FIG. 10 is structurally and functionally indentical to that of FIG. 9 except that the exponential amplifier 126 of FIG. 9 is replaced by a source of exponentially scaled d.c. voltages 141 where the voltages are selected in accordance with the values of the data words $W_n$. For discrete level digital data, the data words $W_n$ control the position of a wiper 142 which taps one of a set of exponentially scaled d.c. voltages provided by a conventional source of potential not shown for simplicity. A voltage corresponding to each of the data information levels is provided with the wiper 142 being positioned by the information level of the data word to contact the corresponding exponentially scaled voltage.

An alternative arrangement for use with discrete level digital data may be instrumented in the manner illustrated in FIG. 4 where the input data sequence $\{W_n\}$ controls the switch control logic 55 of FIG. 4 and the input voltage designated as "from 31" is a d.c. signal rather than the carrier signal previously exemplified as a sinusoid.

For continuous level analog data the voltage source 141 may be instrumented as an infinite resolution potentiometer with a linear decibel taper of a type commonly utilized in audio amplification systems.

It will be appreciated that the wiper 142 of the voltage source 141 may be positioned by a conventional electrical-to-mechanical servomechanism responsive to the data word $W_n$ such that the input data item $W_n$ positions the wiper 142 to contact the voltage $\beta^W$ as indicated by the legend. The output from the voltage source 141 is applied as the $\beta^W$ input to the analog multiplier 127 previously described with respect to FIG. 9.

Referring now to FIG. 11 in which like reference numerals indicate like components with respect to FIG. 3, there is illustrated a reproducing or receiving portion 150 of a data channel instrumented in accordance with the mathematical equivalences previously discussed. The recorded or transmitted signals on the medium 33 are reproduced or received by the reproducing or receiving means 41 which provides the signals to the linear equalizing filter 42 and the phase locked oscillator 48. The output from the linear equalizing filter 42 is applied to the sample and hold circuit 45. The phase locked oscillator 48 applies its output signal to the timing generator 49 which provides timing signals to the sample and hold circuit 45. The components 33, 41, 42, 45, 48 and 49 are structurally and functionally identical to those similarly numbered and previously described with respect to FIG. 3 and for brevity will not be further discussed here.

The output of the sample and hold circuit 45 is applied to an analog divider 151 as well as to an analog delay circuit 152. The analog divider 151 is a conventional circuit of a type readily commercially procurable. The delay circuit 152 is of the type previously described with respect to the delay circuit 129 of FIG. 9. The delay circuit 152 provides a delay of one data word interval and its output is connected to an input of the divider 151, such that when the sample and hold circuit 45 is providing the present data sample to the divider 151, the delay circuit 152 is providing the previous sample thereto. The divider 151 thus provides the ratio or quotient of the present sample divided by the sample just previous thereto for reasons to be explained.

The output of the divider 151 is applied to an analog multiplier 153 and a voltage comparator 154. The multiplier 153 and the voltage comparator 154 may be of the type previously discussed with respect to the components 128 and 130 respectively of FIG. 9. The voltage comparator 154 also receives an input from a reference potential equal to unity and the output thereof is effective through any convenient coupling to operate the wiper of a single pole double throw switch 155. The contacts of the switch 155 are connected to receive a reference potential equal to $\beta^L$ and unity respectively. The output of the wiper of the switch 155 is connected as a second input to the analog multiplier 153 which provides its output signal $\{\beta^{\hat{W}_n}\}$ closely representative of the original data, to a logarithmic amplifier 156 similar to the amplifier 43 of FIG. 3. The logarithmic amplifier 156 converts the sequence $\{\beta^{\hat{W}_n}\}$ to the sequence $\{c^{\hat{W}_n}\}$ where $c$ is a convenient constant.

When the predetermined constant $\beta$ is greater than unity, the voltage comparator 154 is constructed such that when the output of the divider 151 is greater than or equal to the unity reference potential the voltage comparator 154 causes the switch 155 to connect the unity reference potential to the multiplier 153. When, however, $\beta>1$ and the output of the divider 151 is less than unity, the switch 155 is positioned to connect the reference potential $\beta^L$ to the multiplier 153. In this manner successive division in modulo fashion with respect to the exponent L is performed in a manner to be further explained.

In operation during the $n^{th}$ received data interval a signal representative of the cumulative product $P_n$ from either of the circuits of FIGS. 9 or 10 is reproduced or received from the medium 33 by the means 41. This signal is processed as previously described with respect to FIG. 3 through the linear equalizing filter 42 and is sampled and held in the circuit 45. Since the medium 33 is a multiplicatively distorting medium, the cumulative product $P_n$ is distorted by the gain level $k_n$ existent during the $n^{th}$ interval to become $k_n P_n$. During the previous interval $(n-1)$, the signal $k_{n-1} P_{n-1}$ was received, sampled and held, and is presently provided by the delay circuit 152, wherein $k_{n-1}$ was the gain level existent during the previous data interval. Since, as previously mentioned, the gain is considered to be slowly varying with respect to the data rate, $k_n$ and $k_{n-1}$ will be almost equal. During the $n^{th}$ interval the divider 151 provides the ratio $(k_n P_n)/(k_{n-1} P_{n-1})$ which is almost identical to $P_n/P_{n-1} = \beta^U$, where $U_n$ is a number which, modulo L, is equal to $W_n$. The output of the multiplier 153 is therefore a power of the base $\beta$ which can then be reliably and directly identified by the logarithmic amplifier 156 with the original data item conveyed during the $n^{th}$ interval. It is appreciated that when the system gain $k_n$ and $k_{n-1}$ are nearly the same in adjacent intervals, their effect is largely cancelled in the ratio taken by the divider 151, thereby substantially reducing the multiplicative distortion of the slowly varying system gain.

Since the cumulative products provided by the data recording or transmitting portions 125 and 140 of FIGS. 9 and 10 may be generated in modulo fashion with respect to the exponent L, whenever the cumulative product is altered by the factor $\beta^{-L}$ in the multiplier 128 of FIGS. 9 or 10, a similar alteration must be effected in the reproducing or receiving portion 150 of FIG. 11. Thus for $\beta>1$, whenever the ratio between successive samples at the receiver is less than unity, which is indicative of a modulo adjustment at the transmitter, the output of the divider 151 is multiplied by the compensating factor $\beta^L$ in the multiplier 153. When, however, the ratio between successive samples is greater than or equal to unity, which is indicative that a modulo adjustment was not performed in the associated data interval, the voltage comparator 154 causes the output of the divider 151 to be multiplied by unity in the multiplier 153, thus not altering the results.

It will be appreciated that when $\beta$ is a positive constant less than unity, the voltage comparator 154 connects unity voltage to the multiplier 153 when the output of the divider 151 is less than or equal to unity and connects the $\beta^L$ reference potential to the multiplier 153 when the output of the divider 151 is greater than unity. It will be further appreciated than when the recording or transmitting portions 125 and 140 of FIGS. 9 and 10 respectively are configured to perform nonmodulo cumulative multiplication, the divider 151 of FIG. 11 should provide its output directly to the logarithmic amplifier 156 thereby eliminating the multiplier 153, the voltage comparator 154 and the switch 155.

It will be appreciated from the foregoing that because of the mathematical equivalences previously discussed, the signals impressed on the medium 33 by the recording or transmitting means 32 of FIGS. 9 and 10 will be identical to the signals similarly impressed on the medium 33 by the recording or transmitting means 32 of FIG. 2. Thus the signals provided by the embodiments of FIG. 2 and of FIGS. 9 and 10 may be reproduced or received by either of the reproducing or receiving embodiments of FIGS. 3 and 11. In this regard, it will also be appreciated that as previously discussed with respect to FIGS. 2 and 3, the signal from the carrier pulser 31 of FIGS. 9 or 10 may be bipolar or phase-reversal modulated independently of the amplitude level modulation provided by the analog multiplier 91. By this means, an additional bit of information may be conveyed during each data interval by the carrier polarity. The data recovery embodiment of FIG. 11 would then have to be slightly modified, whereby the sign of the output of the linear equalizing filter 42 would be sensed for recovery of the polarity data at the optimum sampling instants, while the absolute magnitude of the output of the linear equalizing filter 42, rather than its signed value, would then be provided to the sample and hold circuit 45.

It will be observed that the input to the analog multiplier 127, of the transmitting portion 125 or 140 of the embodiment shown in FIGS. 9 or 10, is the sequence $\{B^{W_n}\}$. It will further be observed that the input to the logarithmic amplifier 156 of the receiving portion 150 shown in FIG. 11 is a version of this same sequence which has been accurately recovered in the presence of multiplicative channel distortions. Considering the data channel of FIGS. 9–11, when the sequence $\{W_n\}$ is taken to be analog data in which the W's may have a continuum of levels, it will be appreciated that the sequence $\{\beta^W\}$ may then itself be considered to form an analog data sequence having values in the range between, but not including, zero and positive infinity. So considered, it will be appreciated that the exponential amplifier 126 of FIG. 9, the source of exponentially scaled d.c. voltages 141 of FIG. 10, and the logarithmic amplifier 156 of FIG. 11 are not essential to the embodiment of the invention illustrated in FIGS. 9–11. It is also apparent that since analog data can be thus conveyed by amplitude modulation over a multiplicatively distorting channel and accurately recovered without the need for either exponential or logarithmic devices, digital discrete level data may likewise be so conveyed and recovered provided that the zero data level is not permitted.

This simplification of the specific data channel shown in FIGS. 9-11, by the elimination of its exponential and logarithmic devices as explained, will accommodate data which has been scaled to have its levels contained between unity and $\beta^L$ with $\beta>1$. Here, the upper limit $\beta^L$ is quite arbitrary and the parameters $\beta$ and L now no longer have significance apart from specifying this limit.

Similarly, data scaled to have its levels contained between $\beta^L$ and unity, with $0<\beta<1$, may be accommodated in the aforesaid simplification of FIGS. 9-11 merely by modifying the action of the voltage comparators 130 of FIGS. 9 or 10 and 154 of FIG. 11 as previously described with respect to these figures for the condition $0<\beta<1$. Data scaled to have its levels contained within the range $\beta^{-L}$ to $\beta^L$ for a positive $\beta$ may also be accommodated in the aforesaid simplification by passing the output of the analog multiplier 127 of FIGS. 9 or 10 directly to the modulating analog multiplier 91 and the delay circuit 129 and then taking the recovered data directly from the divider 151 of FIG. 11. In order that the signals remain within a finite dynamic range of the channel, neither saturating it nor dropping below the level of additive channel noise, it would be necessary to assure that small data magnitudes occur as frequently as large, relative to unity magnitude, when the data falls in the range $\beta^{-L}$ to $\beta^L$. With no further modification, bipolar data may then be accommodated as well, provided always that the zero level is excluded.

When the data levels are contained between unity and $\beta^L$ with $\beta>0$, no further data restrictions are required for the signals to remain within a finite dynamic range, since this is assured by the overflow or underflow operation of the then included combinations of the analog multipliers 128 and 153, voltage comparators 130 and 154, and switches 131 and 155 of FIGS. 9 or 10 and FIG. 11 respectively. Bipolar data whose absolute magnitudes are contained between unity and $\beta^L$, with $\beta>0$, may likewise be accommodated in the aforesaid simplification of FIGS. 9–11 provided that the input to the voltage comparator 130 from the analog multiplier 127 of FIGS. 9 or 10, and the input to the voltage comparator 154 from the divider 151 of FIG. 11, are both modified to be provided in absolute magnitudes instead of in signed values. The particular operation of the voltage comparators for the bipolar data depends on whether $0<\beta<1$ or $\beta>1$, in the manner previously described.

Figure 12:
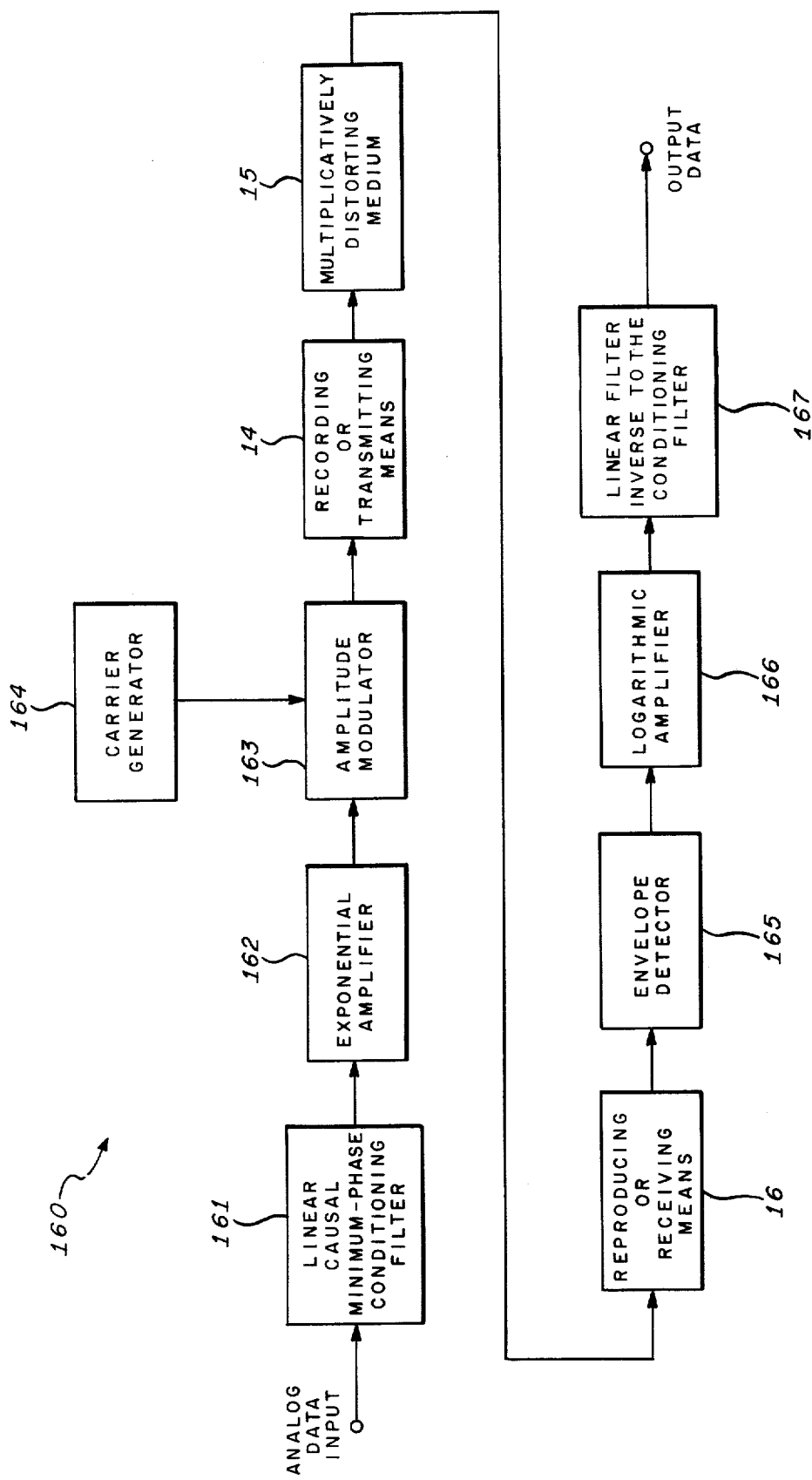
FIG. 12 is a block schematic diagram of still another preferred embodiment of a data channel in accordance with the concepts of the present invention.

The embodiments of the invention heretofore discussed have been described in terms of discrete time and sampled data systems. The concepts of the present invention are equally applicable to processing data of the continuous level, continuous time analog variety. Referring now to FIG. 12 in which like reference numerals indicate like components with respect to FIG. 1, a data channel 160 in accordance with the present invention is illustrated. The continuous level, continuous time analog data signal is applied to a linear, causal, minimum-phase conditioning filter 161 of a type well known in the communication technologies. The filter 161 may, for example, comprise a conventional integrator when the multiplicative distortions are slowly varying with respect to the frequency spectrum of the input data. The signals from the filter 161 are applied to an exponential amplifier 162 of the type functionally and structurally similar to that described with respect to FIGS. 7 and 9. The output of the amplifier 162 is applied as an input to an amplitude modulator 163 which also receives a carrier signal input from a carrier generator 164. The amplitude modulator 163 and the carrier generator 164 are similar respectively to the analog multiplier 91 and carrier pulser 31 described with respect to FIGS. 7, 9 and 10. However, there need not be any fixed timing relationship between the modulation and the carrier provided that the frequency of the latter is high relative to the modulation bandwidth. Alternatively, the carrier may simply be d.c. so that the output of the exponential amplifier 162 is in effect transmitted directly. The amplitude modulator 163 is effective in amplitude modulating the carrier signal provided by the carrier generator 164 in accordance with the filtered and exponentiated data from the blocks 161 and 162.

The amplitude modulated carrier from the modulator 163 is recorded or transmitted by the means 14 via the multiplicatively distorting medium 15 to the reproducing or receiving means 16 in a manner similar to that described with respect to FIG. 1.

The multiplicatively distorted reproduced or received signal from the means 16 is applied to a conventional envelope detector 165 which, however, is not required if the carrier is d.c., which detects the amplitude modulated carrier providing the multiplicatively distorted data impressed thereupon. The output of the envelope detector 165 is applied to a logarithmic amplifier 166 that converts the multiplicative distortions to additive distortions in the manner previously described with respect to FIGS. 1–8. The output from the logarithmic amplifier 166 is applied to a linear filter 167 having a frequency transfer function inverse to that of the conditioning filter 161. The filter 167 is designed to suppress the multiplicative disturbances after they have been converted to additive distortions by the logarithmic amplifier 166. The filter 167 may, for example, be instrumented as a conventional differentiator when the multiplicative distortions are slowly varying with respect to the frequency spectrum of the data, the filter 161 then being an integrator. The linear filter 167 thus provides the substantially undistorted data at its output.

The data carrying capacities of the data channels heretofore described, may be further increased by frequency modulating the carrier signals with additional information. The receiver portion of such a data channel would then include a conventional F.M. demodulator to obtain the transmitted data from the received frequency modulated carrier.

The concept of the present invention may find utility in a wide variety of applications as previously discussed. More specifically, in addition to the magnetic data recording embodiments of the invention, heretofore described, the invention may be utilized in the transmission of speech or facsimile information over transoceanic short-wave radio circuits. The data channel 160 of FIG. 12 may be particularly adapted to such a use. Such data channels are subject to severe fading since they depend on the unstable phenomenon of the propagation via reflection from the ionosphere. This fading results in a slowly varying multiplicative distortion of the transmitted signal which distortion can be suppressed by utilizing the sequence of operations described above. In such systems in the prior art, the transmission of a reference pilot tone along with the information to be conveyed is utilized for accurate amplitude modulated transmissions over fading radio channels where the strength of the reference tone is measured at the receiver and used for automatic gain control. Such a pilot tone is not utilized in the present invention resulting in possible significant reduction in transmitted power compared to prior art systems absent the invention, and in possible equipment simplification.

The concepts of the present invention are also applicable to the storage of digital data on photographic film where the invention will facilitate the storage of the data as multi-level "shades of gray" rather than the conventional binary black and white, thereby achieving significantly higher storage densities. Inhomogeneities of the film which may previously have precluded such multi-level storage may be considered as creating spatial multiplicative distortion which is spatially separable from the data when following the precepts of the invention. The time dimension of the heretofore described embodiments of the invention may be considered replaced by a linear spatial dimension on the photographic film. The exponential conversion required in the photographic recording may possibly be included as an integral property of the film by controlling the "gamma" contrast of opacity vs. light exposure of the film and the logarithmic converter in the readback may be possible of inclusion integrally with the photocell response characteristics.

The heretofore described embodiments of the present invention have been explained in terms of data recording or data transmission channels. It will be appreciated that for the purposes of the appended claims, since the concepts of the invention are equally applicable to data recording channels, data transmission channels and the like, these terms may be considered synonomous with respect to each other. Additionally, the terms data system and data channel have been utilized interchangeably hereinabove in the description of the embodiments of the invention. It is appreciated that these terms may herein be considered synonomous with respect to each other.

In the above descriptions of the embodiment of the invention, the terms "data word interval" or "data interval" have been utilized with respect to the data word $W_n$ for both the recording or transmitting portions and the reproducing or receiving portions of the systems. It is, of course, understood that the $i^{th}$ data interval with respect to the recording portion and the $i^{th}$ data interval with respect to the reproducing portion are not normally coincident in time. For example, the data word $W_i$ recorded during the $i^{th}$ data interval of the recording portion of the system, is normally reproduced at a subsequent time during the $i^{th}$ data interval of the reproducing portion of the system.

While the invention has been described as providing a substantial reduction of the effects of multiplicative distortion arising from, for example, gain variations in a data recording or transmission channel, it will be further appreciated that multiplicative distortions may be caused by other phenomena. For example, there exist conventional magnetic recording systems in which the writing or recording means employs frequency modulation or pulse duration modulation and in which the reading or reproducing means employs frequency demodulation or pulse duration demodulation, respectively, in order to circumvent the effects of channel gain variation in a manner familiar to the art. However, speed variation in the recording medium of such a recording system will impart multiplicative distortion to the signal output from the reproducing means relative to the signal input to the recording means. Since the present invention suppresses multiplicative distortion irrespective of its underlying cause, it may well find application in, for example, magnetic recording systems of the frequency modulation or pulse duration modulation variety. As another example, in conventional so-called "direct" magnetic recording employing inductive magnetic playback, which is the type of recording that has mainly been considered in the foregoing, speed variations will impart multiplicative distortion through the timederivative transfer characteristic thereof. Therefore, the invention may also have application in so-called "start-stop" direct-recording magnetic tape systems of the computer industry, where speed variations are severe.

The above described embodiments of the invention were primarily explained in terms of slowly varying multiplicative distortions. It will be appreciated that the present invention is also applicable to the filtering of multiplicative distortions of a rapidly varying variety. Generally, multiplicative variations whose logarithms have sufficiently different spectra from that of the data may be filtered therefrom in accordance with the concepts of the invention as described above and as recited in the appended claims.

The foregoing embodiments of the invention have been explained in terms of exponential functions. It will be appreciated that functions which are essentially or approximately exponential may also be utilized. For example, such functions as the hyperbolic cosine cosh $x = (e_x+e^{-x})/2$ which for large values of the argument $x$ becomes essentially exponential, may be employed in practicing the invention. The term exponential function is construed herein in accordance with the accepted mathematical definition thereof known in the art as defined, for example, in the IEEE Standard Dictionary of Electrical and Electronic Terms, published by John Wiley & Sons, Inc. as a function of the form $Y = a\ e^{bx}$ where $x$ is the independent variable and $e$ is a constant base. The exponential functions described herein above, for example, the constant $\beta$ raised to a power of the data, is of this form. Functions may also be utilized that behave essentially as the exponential function as defined. The hyperbolic cosine function given above behaves as an essentially exponential function for large values of the argument $x$ since for such values the term $e^{-x}$ becomes negligible and the expression for cosh $x$ then reduces essentially to the exponential format as defined. Similarly, where logarithmic functions have been referred to in the previous discussion, it will be appreciated that functions which are essentially or approximately logarithmic may also be utilized. Although the present invention has been explained in terms of multi-level data systems, it should be noted that the invention is also applicable to use in binary systems which in the absence of the present invention may suffer from multiplicative disturbances.

It will be additionally appreciated that for the purposes of the appended claims where they may refer to modulo operations, the terms overflow and underflow may be considered synonomous with respect to each other in accordance with the type of data as previously explained.

It will also be appreciated that the filtering or suppression of multiplicative distortion as described hereinabove may be considered as including gain variation compensation.

While the invention has been described in its preferred embodiments, it is to be understood that the words which have been used are words of description rather than limitation and that changes may be made within the purview of the appended claims without departing from the true scope and spirit of the invention.

We claim:

1. In combination for use with a data source for providing a sequence of data items
    accumulator means responsive to said sequence of data items for algebraically accumulating said data items in accordance with a preconditioning function thereby forming a sequence of output partial sums respectively,
    exponentiating means coupled to the output of said accumulator means and responsive to said sequence of output partial sums for sequentially providing an essentially exponential function thereof by sequentially raising a base to a power proportional to said output partial sums respectively, thereby providing a sequence of first signals respectively,
    said first signals being subject to multiplicative distortions which are filterable with respect to said data items thereby providing a sequence of distorted first signals,
    logarithmic converter means responsive to said sequence of distorted first signals for sequentially providing a logarithmic function thereof, respectively, inverse to said exponential function, thereby providing a sequence of second signals respectively,
    said logarithmic converter means converting said multiplicative distortions to additive distortions,
    subtractor means coupled to said logarithmic converter means for providing algebraic differences between said second signals in accordance with a function inverse to said preconditioning function, thereby performing a substractive operation providing a sequence of third signals representative of said sequence of data items, respectively, with said additive distortions substantially filtered therefrom by said subtractive operation, and
    memory means in said subtracter means for storing at least one of said second signals occurring prior to the currently occurring of said second signals thereby providing signals for said subtracter means to provide said algebraic differences.

2. The combination of claim 1 in which
    said accumulator means comprises an accumulator for algebraically accumulating said data items to form a sequence of first order partial sums thereby providing said sequence of output partial sums,
    said memory means comprises a two word memory for storing two successively occurring of said second signals, and
    said subtracter means comprises a subtracter coupled to said two word memory for sequentially algebraically subtracting said second signals from each other to provide a sequence of first order differences thereby providing said sequence of third signals respectively.

3. The combination of claim 1 in which said accumulator means comprises
    an accumulator for algebraically accumulating said sequence of data items thereby providing a sequence of first order partial sums and,
    further accumulator means for algebraically accumulating said sequence of first order partial sums to provide a further sequence of higher order partial sums thereby providing said sequence of output partial sums.

4. The combination of claim 3 in which said subtracter means comprises
    a subtracter for sequentially algebraically subtracting said second signals from each other thereby providing a sequence of first order differences, and
    further subtracter means for sequentially algebraically subtracting said first order differences from each other to provide higher order differences thereof, thereby providing said sequence of third signals representative of said sequence of data items respectively with said additive distortion further filtered therefrom.

5. In combination for use with a data source for providing a sequence of data items
    accumulator means responsive to said sequence of data items for algebraically accumulating said data items in modulo in accordance with a preconditioning function thereby forming a sequence of output partial sums respectively, exponentiating means coupled to the output of said accumulator means and responsive to said sequence of output partial sums for sequentially providing an essentially exponential function thereof by sequentially raising a base to a power proportional to said output partial sums respectively, thereby providing a sequence of first signals respectively, said first signals being subject to multiplicative distortions which are filterable with respect to said data items thereby providing a sequence of distorted first signals, logarithmic converter means responsive to said sequence of distorted first signals for sequentially providing a logarithmic function thereof, respectively, inverse to said exponential function, thereby providing a sequence of second signals respectively, said logarithmic converter means converting said multiplicative distortions to additive distortions, subtractor means coupled to said logarithmic converter means for providing algebraic differences in modulo between said second signals in accordance with a function inverse to said preconditioning function thereby providing a subtractive operation providing a sequence of third signals representative of said sequence of data items, respectively, with said additive distortions substantially filtered therefrom by said subtractive operation, and memory means in said subtractor means for storing at least one of said second signals occurring prior to the currently occurring of said second signals thereby providing signals for said subtractor means to provide said algebraic differences.

6. The combination of claim 5 in which
said accumulator means comprises an accumulator for algebraically accumulating said data items in modulo to form a sequence of first order partial sums thereby providing said sequence of output partial sums,
said memory means comprises a two word memory for storing two successively occurring of said second signals, and
said subtracter means comprises a subtracter coupled to said two word memory for sequentially algebraically subtracting said second signals from each other in modulo to provide a sequence of first order differences thereby providing said sequence of third signals respectively.

7. The combination of claim 5 in which said accumulator means comprises
an accumulator for algebraically accumulating said sequence of data items in modulo thereby providing a sequence of first order partial sums, and
further accumulator means for algebraically accumulating said sequence of first order partial sums in modulo to provide a further sequence of higher order partial sums thereby providing said sequence of output partial sums.

8. The combination of claim 5 in which said subtracter means comprises
a subtracter for sequentially algebraically subtracting said second signals from each other in modulo thereby providing a sequence of first order differences, and further subtracter means for sequentially algebraically subtracting said first order differences from each other in modulo to provide higher order differences thereof, thereby providing said sequence of third signals representative of said sequence of data items respectively with said additive distortion further filtered therefrom.

9. In combination for use with a data source of providing a sequence of data items
exponentiating means responsive to said sequence of data items for sequentially providing an essentially exponential function thereof by sequentially raising a base to a power proportional to said data items respectively,
cumulative multiplying means coupled to the output of said exponentiating means for providing the cumulative product of said exponential function of said sequence of data items in accordance with a conditioning function, thereby forming a sequence of first signals respectively,
said first signals being subject to multiplicative distortions which are filterable with respect to said data items thereby providing a sequence of distorted first signals,
ratio converter means responsive to said sequence of distorted first signals for providing ratios therebetween in accordance with a function inverse to said conditioning function, thereby performing a ratio operation providing a sequence of second signals, respectively, with said multiplicative distortions substantially filtered therefrom by said ratio operation,
memory means in said ratio converter means for storing at least one of said distorted first signals occurring prior to the currently occurring of said distorted first signals thereby providing signals for said ratio converter means to provide said ratios, and
logarithmic converter means coupled to the output of said ratio converter means and responsive to said sequence of second signals for sequentially providing a logarithmic function thereof, respectively, inverse to said exponential function, thereby providing a sequence of third signals representative of said sequence of data items respectively.

10. In combination for use with a data source for providing a sequence of data items
exponentiating means responsive to said sequence of data items for sequentially providing an essentially exponential function thereof by sequentially raising a base to a power proportional to said data items respectively,
cumulative multiplying means coupled to the output of said exponentiating means for providing the cumulative product of said exponential function of said sequence of data items in modulo with respect to the exponent in accordance with a conditioning function, thereby forming a sequence of first signals respectively,
said first signals being subject to multiplicative distortions which are filterable with respect to said data items thereby providing a sequence of distorted first signals,
ratio converter means responsive to said sequence of distorted first signals for providing ratios therebetween in modulo with respect to the exponent in accordance with a function inverse to said conditioning function, thereby performing a ratio operation providing a sequence of second signals, respectively, with said multiplicative distortions substantially filtered therfrom by said ratio operation, memory means in said ratio converter means for storing at least one of said distorted first signals occurring prior to the currently occurring of said distorted first signals thereby providing signals for said ratio converter means to provide said ratios, and logarithmic converter means coupled to the output of said ratio converter means and responsive to said sequence of second signals for sequentially providing a logarithmic function thereof, respectively, inverse to said exponential function, thereby providing a sequence of third signals representative of said sequence of data items respectively.

11. In combination for use with a data source for providing a sequence of data items accumulator means responsive to said sequence of data items for algebraically accumulating said data items in accordance with a preconditioning function thereby forming a sequence of output partial sums respectively, exponentiating means coupled to the output of said accumulator means and responsive to said sequence of output partial sums for sequentially providing an essentially exponential function thereof by sequentially raising a base to a power proportional to said output partial sums respectively, thereby providing a sequence of first signals respectively, said first signals being subject to multiplicative distortions which are filterable with respect to said data items thereby performing a sequence of distorted first signals, ratio converter means responsive to said sequence of distorted first signals for providing ratios therebetween, thereby performing a ratio operation providing a sequence of second signals, respectively, with said multiplicative distortions substantially filtered therefrom by said ratio operation, memory means in said ratio converter means for storing at least one of said distorted first signals occurring prior to the currently occurring of said distorted first signals thereby providing signals for said ratio converter means to provide said ratios, and logarithmic converter means coupled to the output of said ratio converter means and responsive to said sequence of second signals for sequentially providing a logarithmic function thereof, respectively, inverse to said exponential function, thereby providing a sequence of third signals representative of said sequence of data items respectively.

12. In combination for use with a data source for providing a sequence of data items exponentiating means responsive to said sequence of data items for sequentially providing an essentially exponential function thereof by sequentially raising a base to a power proportional to said data items respectively, cumulative multiplying means coupled to the output of said exponentiating means for providing the cumulative product of said exponential function of said sequence of data items in accordance with a conditioning function, thereby forming a sequence of first signals respectively, said first signals being subject to multiplicative distortions which are filterable with respect to said data items thereby providing a sequence of distorted first signals, logarithmic converter means responsive to said sequence of distorted first signals for sequentially providing a logarithmic function thereof, respectively, inverse to said exponential function, thereby providing a sequence of second signals respectively, said logarithmic converter means converting said multiplicative distortions to additive distortions, subtractor means coupled to said logarithmic converter means for providing algebraic differences between said second signals, thereby performing a subtractive operation providing a sequence of third signals representative of said sequence of data items, respectively, with said additive distortions substantially filtered therefrom by said subtractive operation, and memory means in said subtractor means for storing at least one of said second signals occurring prior to the currently occurring of said second signals thereby providing signals for said subtractor means to provide said algebraic differences.

13. In combination for use with a data source for providing variable data preconditioning means responsive to said variable data for preconditioning said data in accordance with a preconditioning function, exponentiating means coupled to the output of said preconditioning means and responsive to said preconditioned data for providing an essentially exponential function thereof by raising a base to a power proportional to said preconditioned data thereby providing first signals, said first signals being subject to multiplicative distortions which are filterable with respect to said data thereby providing distorted first signals, logarithmic converter means responsive to said distorted first signals for providing a logarithmic function thereof, inverse to said exponential function, thereby converting said multiplicative distortions to additive distortions, data restoration means coupled to said logarithmic converter means for restoring said logarithmic function of said distorted first signals in accordance with a function inverse to said preconditioning function, thereby providing second signals representative of said variable data with said additive distortions substantially filtered therefrom, a source of carrier signal for providing a carrier signal withi information content unrelated to that of said variable data, and means for amplitude modulating said carrier signal with said exponential function thereby providing said first signals.

14. The combination of claim 13 in which said preconditioning means includes integration means responsive to said data for providing the integral thereof, said exponentiating means being responsive to said integrated data for providing said first signals.

15. The combination of claim 14 in which said data restoration means includes differentiating means responsive to said logarithmic function of said first signals for providing the derivative thereof, thereby providing said second signals representative of said variable data with said additive distortions substantially filtered therefrom.

16. In a digital recording channel having a recording medium, means for writing data items on said medium and means for reading said data items from said medium, each said data item being representable by a selected one of a plurality of amplitudes, the combination comprising accumulator means responsive to a sequence of said data items for algebraically accumulating said data items in accordance with a preconditioning function thereby forming a sequence of output partial sums respectively, exponentiating means coupled to the output of said accumulator means and responsive to said sequence of output partial sums for sequentially providing an essentially exponential function thereof to said writing means for recording on said medium by sequentially raising a base to a power proportional to said output partial sums respectively, said reading means providing a sequence of first signals representative of said recorded exponential function of said output partial sums, respectively, said first signals being subject to multiplicative gain variation distortions of said channel, thereby providing a sequence of distorted first signals, logarithmic converter means responsive to said sequence of distorted first signals for sequentially providing a logarithmic function, thereof, respectively, inverse to said exponential function, thereby providing a sequence of second signals respectively, said logarithmic converter means converting said multiplicative distortions to additive distortions, subtractor means coupled to said logarithmic converter means for providing algebraic differences between said second signals in accordance with a function inverse to said preconditioning function, thereby performing a subtractive operation providing a sequence of third signals representative of said sequence of data items, respectively, with said additive distortions substantially filtered therefrom by said subtractive operation, and memory means in said subtractor means for storing at least one of said second signals occurring prior to the currently occurring to said second signals thereby providing signals for said subtractor means to provide said algebraic differences.

17. The combination of claim 16 in which said accumulator means comprises an accumulator for algebraically accumulating said data items to form a sequence of first order partial sums thereby providing said sequence of output partial sums, said memory means comprises a two word memory for storing two successively occurring of said second signals, and said subtracter means comprises a subtracter coupled to said two word memory for sequentially algebraically subtracting said second signals from each other to provide a sequence of first order differences thereby providing said sequence of third signals respectively.

18. The combination of claim 16 in which said accumulator means comprises an accumulator for algebraically accumulating said sequence of data items thereby providing a sequence of first order partial sums, and further accumulator means for algebraically accumulating said sequence of first order partial sums to provide a further sequence of higher order partial sums thereby providing said sequence of output partial sums.

19. The combination of claim 18 in which said subtractor means comprises a subtracter for sequentially algebraically subtracting said second signals from each other thereby providing a sequence of first order differences, and further subtracter means for sequentially algebraically subtracting said first order differences from each other to provide higher order differences thereof, thereby providing said sequence of third signals representative of said sequence of data items respectively with said additive distortion further filtered therefrom.

20. In a digital recording channel having a recording medium, means for writing data items on said medium and means for reading said data items from said medium, each said data item being represented by a selected one of a plurality of amplitudes, the combination comprising accumulator means responsive to a sequence of said data items for algebraically accumulating said data items in modulo in accordance with a preconditioning function thereby a sequence asequence of output partial sums respectively, exponentiating means coupled to the output of said accumulator means and responsive to said sequence of output partial sums for sequentially providing an essentially exponential function thereof to said writing means for recording on said medium by sequentially raising a base to a power proportional to said output partial sums respectively, said reading means providing a sequence of first signals representative of said recorded exponential function of said output partial sums, respectively, said first signals being subject to multiplicative gain variation distortions of said channel thereby providing a sequence of distorted first signals, logarithmic converter means responsive to said sequence of distorted first signals for sequentially providing a logarithmic function thereof, respectively, inverse to said exponential function, thereby providing a sequence of second signals respectively, said logarithmic converter means converting said multiplicative distortions to additive distortions, subtractor means coupled to said logarithmic converter means for providing algebraic differences in modulo between said second signals in accordance with a function inverse to said preconditioning function, thereby performing a subtractive operation providing a sequence of third signals representative of said sequence of data items, respectively, with said additive distortions substantially filtered therefrom by said subtractive operation, and memory means in said subtractor means for storing at least one of said second signals occurring prior to the currently occurring of said second signals thereby providing signals for said subtractor means to provide said algebraic differences.

21. The combination of claim 20 in which said accumulation means comprises an accumulator for algebraically accumulating said data items in modulo to form a sequence of first order partial sums thereby providing said sequence of output partial sums, said memory means comprising a two word memory for storing two successively occurring of said signals, and said subtracter means comprises a subtracter coupled to said two word memory for sequentially algebraically subtracting said second signals from each other in modulo to provide a sequence of first order differences thereby providing said sequence of third signals respectively.

22. The combination of claim 20 in which said accumulator means comprises an accumulator for algebraically accumulating said sequence of data items in modulo thereby providing a sequence of first order partial sums, and further accumulator means for algebraically accumulating said sequence of first order partial sums in modulo to provide a further sequence of higher order partial sums thereby providing said sequence of output partial sums.

23. The combination of claim 22 in which said subtracter means comprises a subtracter for sequentially algebraically subtracting said second signals from each other in modulo thereby providing a sequence of first order differences, and further subtracter means for sequentially algebraically subtracting said first order differences from each other in modulo to provide higher order differences thereof, thereby providing said sequence of third signals representative of said sequence of data items respectively with said additive distortion further filtered therefrom.

24. The combination of claim 16 further including a source of carrier signal, and means for amplitude modulating said carrier signal with said exponential function of said output partial sums, said modulated carrier signal being provided to said writing means for recording on said medium.

25. The combination of claim 24 in which said source of carrier signal provides a carrier signal with information content unrelated to that of said data items.

26. The combination of claim 16 further including equalization means coupled between said reading means and said logarithmic converter means for reducing inter-symbol interference amongst said multiplicatively distorted first signals with respect to said recorded data items thereby permitting dense recording of said data items on said medium.

27. The combination of claim 20 in which said accumulator means comprises an accumulator with a discarded overflow signal thereby performing said accumulation of said data items in modulo.

28. The combination of claim 27 in which said exponentiating means comprises control means coupled to said accumulator for providing a plurality of discrete signals in accordance with the instantaneously stored value in said accumulator, and an exponentiating circuit responsive to said discrete signals for selectively providing said exponential function in accordance therewith thereby providing an exponential function of said instantaneously stored value in said accumulator.

29. The combination of claim 28 further including a source of carrier signal for providing said carrier signal to said exponentiating circuit wherein said carrier signal is amplitude modulated by said exponential function, said modulated carrier signal being provided to said writing means for recording on said medium.

30. The combination of claim 27 in which said exponentiating means comprises digital to analog converter means coupled to said accumulator for providing an analog signal corresponding to the instantaneously stored digital value in said accumulator, and an exponentiating circuit responsive to said analog signal for providing said exponential function thereof, thereby providing an exponential function of said instantaneously stored digital value in said accumulator.

31. The combination of claim 30 further including a source of carrier signal for providing said carrier signal to said exponentiating circuit wherein said carrier signal is amplitude modulated by said exponential function, said modulated carrier signal being provided to said writing means for recording on said medium.

32. The combination of claim 20 in which said subtracter means comprises a subtracter with a discarded underflow signal, said subtracter being responsive to successively occurring logarithmically converter distorted first signals for obtaining the differences therebetween, thereby providing said sequential algebraic differences in modulo.

33. The combination of claim 16 in which said reading means includes a reading device having a time derivative transfer characteristic and in which said writing means includes polarity switching means responsive to said exponential function of said amplitudes for selectively controlling the polarity thereof, thereby providing a polarity controlled signal, and integrator means responsive to said polarity controlled signal for compensating for said time derivative characteristic thereby providing signals for recording on said medium, said polarity switching means being operative to control said polarity so that said signals for recording on said medium remain in a finite dynamic range.

34. A method for reducing multiplicative distortions in a data channel for conveying a sequence of data items comprising the steps of algebraically accumulating said data items in accordance with a preconditioning function thereby forming a sequence of output partial sums respectively, exponentiating said sequence of output partial sums by sequentially providing an essentially exponential function thereof by sequentially raising a base to a power proportional to said output partial sums respectiely, thereby providing a sequence of first signals respectively, conveying said sequence of first signals on said channel whose characteristics impart multiplicative distortions thereto thereby providing a sequence of distorted first signals, logarithmically converting said sequence of distorted first signals by providing a logarithmic function thereof, respectively, inverse to said exponential function, thereby providing a sequence of second signals respectively, said logarithmically converting step converting said multiplicative distortions to additive distortions, algebraically subtracting said second signals from each other to provide algebraic differences therebetween in accordance with a function inverse to said preconditioning function thereby providing a sequence of third signals representative of said sequence of data items, respectively, with said additive distortions substantially filtered therefrom by said subtracting step, and storing at least one of said second signals occurring prior to the currently occurring of said second signals thereby providing the signals for said subtracting step.

35. The method of claim 34 in which said step of algebraically accumulating comprises the step of algebraically accumulating said sequence of data items forming a sequence of first order partial sums thereby providing said sequence of output partial sums, said step of storing comprises storing two successively occurring of said second signals, and said step of algebraically subtracting comprises the step of algebraically subtracting said second signals from each other forming a sequence of first order differences thereby providing said sequence of third signals, respectively.

36. The method of claim 34 in which said step of algebraically accumulating comprises the steps of algebraically accumulating said sequence of data items forming a sequence of first order partial sums, and algebraically accumulating said sequence of first order partial sums forming a sequence of higher order partial sums thereby providing said sequence of output partial sums.

37. The method of claim 36 in which said step of algebraically subtracting comprises the steps of algebraically subtracting said second signals from each other thereby providing a sequence of first order differences, and subtracting said sequence of first order differences from each other forming a sequence of higher order differences thereby providing said sequence of third signals, respectively, with said additive distortions further filtered therefrom.

* * * * *